(12) United States Patent
Kalathil et al.

(10) Patent No.: US 10,578,743 B1
(45) Date of Patent: Mar. 3, 2020

(54) SYSTEM AND METHOD OF LOCATION DETERMINATION USING MULTIPLE LOCATION INPUTS

(71) Applicant: Intel Corporation, Santa Clara, CA (US)

(72) Inventors: Rakesh Kalathil, San Diego, CA (US); Venkatesan Nallampatti Ekambaram, Hillsboro, OR (US); Shilpa Talwar, Cupertino, CA (US); Feng Xue, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/234,193

(22) Filed: Dec. 27, 2018

(51) Int. Cl.
*H04W 64/00* (2009.01)
*G01S 19/07* (2010.01)
*G01S 19/51* (2010.01)
*G01S 11/08* (2006.01)

(52) U.S. Cl.
CPC ............ *G01S 19/07* (2013.01); *G01S 11/08* (2013.01); *G01S 19/51* (2013.01); *H04W 64/003* (2013.01)

(58) Field of Classification Search
CPC ..... H04W 4/023; H04W 4/025; H04W 4/026; H04W 4/027; H04W 4/029; H04W 64/00; H04W 64/003; H04W 64/006; G01S 19/05; G01S 19/07; G01S 19/11; G01S 19/45; G01S 19/48
See application file for complete search history.

(56) References Cited

U.S. PATENT DOCUMENTS

| 2010/0066603 A1* | 3/2010 | O'Keefe | G01C 15/00 342/357.27 |
|---|---|---|---|
| 2016/0259062 A1* | 9/2016 | Raghupathy | G01S 19/48 |
| 2018/0084387 A1* | 3/2018 | Le Grand | H04W 4/026 |
| 2018/0231385 A1* | 8/2018 | Fourie | G01C 22/00 |

* cited by examiner

*Primary Examiner* — Jean A Gelin
(74) *Attorney, Agent, or Firm* — Schwegman Lundberg & Woessner, P.A.

(57) ABSTRACT

Systems and methods of determining a device position are described. GPS and cellular signals, in addition to VIO displacement are used to determine the device position via a loose or tight coupling algorithm. Both algorithms iteratively linearize base station position equations around an intermediate position that changes each iteration based on VIO displacement and solves the linearized solutions until convergence. The loose coupling algorithm uses the GPS fix as an initiation position, linearizing and solving using the base station equations only. The tight coupling algorithm linearizes both the base station and GPS position equations, using an arbitrary initial position. To account for multipath effects, the linearization and solution are performed for multiple random sets of measurements and the position with the smallest error metric is selected.

22 Claims, 15 Drawing Sheets

SYSTEM AND METHOD OF LOCATION DETERMINATION USING MULTIPLE LOCATION INPUTS

TECHNICAL FIELD

Aspects pertain to positional determination. Some aspects relate to positional determination using multiple location inputs, including cellular, global position satellite (GPS), and visual data.

BACKGROUND

Mobile communications are ubiquitous, providing voice and data services that operate on various $3^{rd}$ Generation Partnership Project (3GPP) networks and other networks such as Long Term Evolution (LTE) and LTE advanced (LTE-A) networks as well as $4^{th}$ generation (4G) networks and $5^{th}$ generation (5G) networks. An ever-increasing number of mobile communication services of user equipment (UEs) use or request positioning information of the UE. The UE may generally obtain positioning information through the Global Positioning System (GPS). However, in many situations GPS positioning may be insufficient, in particular in high resolution or 3 dimensional applications. The horizontal accuracy of GPS is typically around 7.8 meters with 95% confidence, and the vertical is typically much worse.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
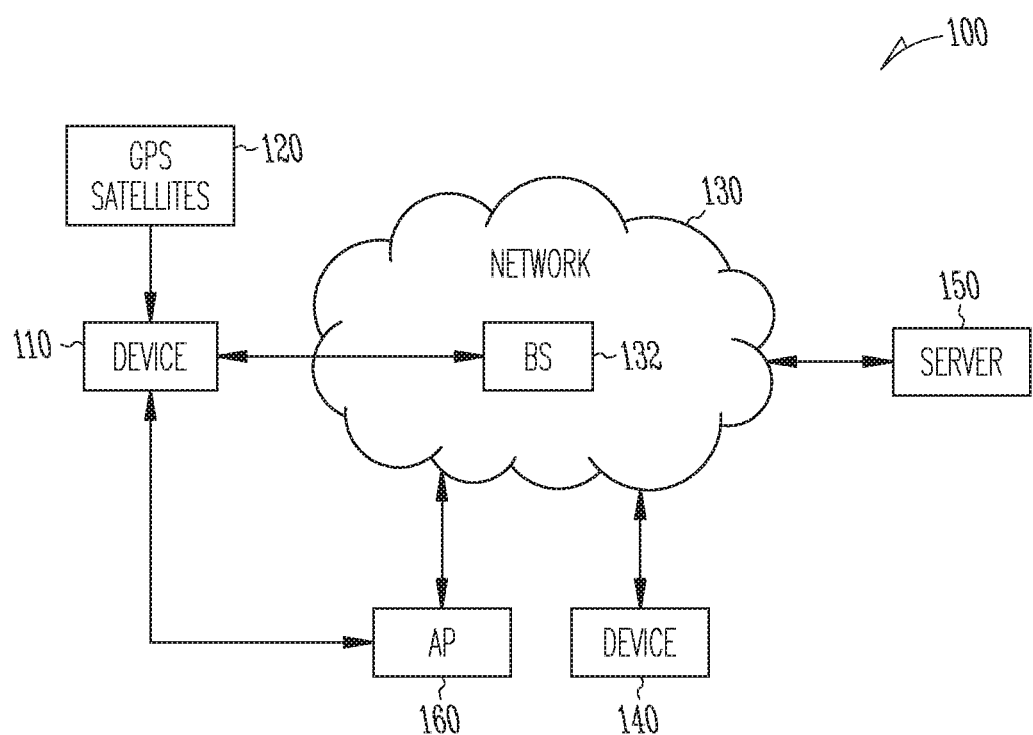
FIG. 1 is a functional block diagram illustrating a system according to some aspects.

FIG. 1 is a functional block diagram illustrating a system according to some aspects. The system 100 may include multiple devices 110, 140. In some aspects, one or both the devices 110, 140 may be communication devices that communicate with each other directly (e.g., via P2P or other short range communication protocol) or via one or more short range or long range wireless networks 130. The devices 110, 140 may, for example, communicate wirelessly locally, for example, via one or more micro, pica or nano base stations (BSs) 132 or access points (APs) 160 or directly using any of a number of different techniques, such as WiFi, Bluetooth or Zigbee, among others. The devices 110, 140 may also communicate through the network 130 via Third Generation Partnership Project Long Term Evolution (3GPP LTE) protocols and LTE advanced (LTE-A) protocols, $4^{th}$ generation (4G) protocols or next ($5^{th}$) generation (NG) protocols. Examples of devices 110, 140 include, but are not limited to, mobile devices such as portable handsets, smartphones, tablet computers, laptop computers, wearable devices, sensors and drones.

The network 130 may contain network devices such as an access point for WiFi networks, a base station (which may be e.g., an enhanced NodeB (eNB) or NG NodeB (gNB)), gateway (e.g., a serving gateway and/or packet data network gateway), a Home Subscriber Server (HSS), a Mobility Management Entity (MME) for LTE networks or an Access and Mobility Function (AMF), etc., for NG networks. The network 130 may also contain various servers that provide content or other information related to user accounts.

The system 100 may also include GPS satellites 120 that provide GPS signals to the device 110. The GPS satellites 120 are synchronized with one another and with ground clocks. The locations of the GPS satellites 120 are known with great precision. The GPS satellites 120 continuously transmit data indicating the current time and position. A GPS receiver in the device 110 may monitor multiple satellites and triangulate to determine the position of the device 110. In different aspects, the device 110 may use GPS alone or in combination with other positioning techniques.

Other positioning techniques include Assisted Global Navigation Satellite Systems (A-GNSS), Observed Time Difference of Arrival (OTDOA), and Enhanced Cell ID (ECID). In general, known reference signals (also called pilots) may be transmitted to the device 110. These techniques may use various control signals (also referred to herein as ranging signals) that occupy different resource elements, such as a Discovery Reference Signal (DRS) or a positioning reference signal (PRS). A-GNSS systems may use data available from the network, specifically, an earlier determined position of the device 110, to either allow the device 110 to acquire the GNSS satellites faster or help calculate the position of the device 110. OTDOA may use predetermined signaling from neighbor cells (i.e., BSs) to derive an observed time difference of arrival relative to the serving or reference cell. The serving cell may be selected based on received signal strength or quality as determined using signal-to-noise-and-interference ratio (SINR) or reference signal received quality (RSRQ), for example.

In determining OTDOA, for example, a location server 150 or the BS 132 may transmit OTDOA reference cell information to the device 110. The location server 150 may be a physical or logical entity that collects measurement data and other location information from the device 110 and BS 132 and assists the device 110 with an estimation of the position of the device 110, providing a calculation of the network-based location.

In OTDOA, the device 110 may measure the time difference between PRSs transmitted by the neighboring cells during a predetermined period of time to estimate the time offsets between the positioning reference signals from the different cells. Higher layer signaling may provide the UE with the positioning reference signal parameters that enables the UE to process the positioning reference signals. Specifically, this information may include the carrier index or frequency band where the positioning reference signal is transmitted, bandwidth of the positioning reference signals, duration (number of consecutive subframes for positioning reference signal transmissions), transmission periodicity, subframe offset and muting sequence. The device 110 may then report the estimated time offsets with an estimate of the measurement quality to the BS 132 and the BS 132 may report this information to the location server 150, The location server 150 may use the time difference estimates, the positions of the cells, which is fixed and known, and the transmit time offsets, which are measured by the device 110, to estimate the position of the device 110. Note that although being shown as separate from the network 130, in some aspects the location server 150 may be disposed within the network 130.

The ECID technique may estimate the device 110 position as a function of distance from the serving cell using round trip time between the device 110 and the BS 132, as well as the fixed geographical coordinates of the BS 132 and the cell size. ECID can be used with a single BS or with multiple neighboring BSs in addition to the serving BS 132. Specifically, in a single BS reporting aspect, the device 110 may report to the BS the ID of the serving cell, the measured timing advance (i.e., the difference between transmit and receive time) and the measured received power of the signals from the serving BS 132. The device 110 may obtain the cell ID, for example, by paging or from of system information transmitted by the BS 132. In a multi-BS reporting aspect, the device 110 may report the same information as in the single BS aspect for all BSs. This is to say that the device 110 may report the timing advance and power of the signals from each BS (both the serving BS and one or more neighbor BSs) as well as the ID and estimated timing and power of the detected BS. In either of these aspects, the measurements may be taken by the device 110 and based on Reference Signal Received Power (RSRP), Timing Advance (TADV) or Round Trip Time (RTT) estimations. The RSRP may be the average power over the entire bandwidth of resource elements that carry a Cell Specific Reference Signal (CRS).

Figure 2:
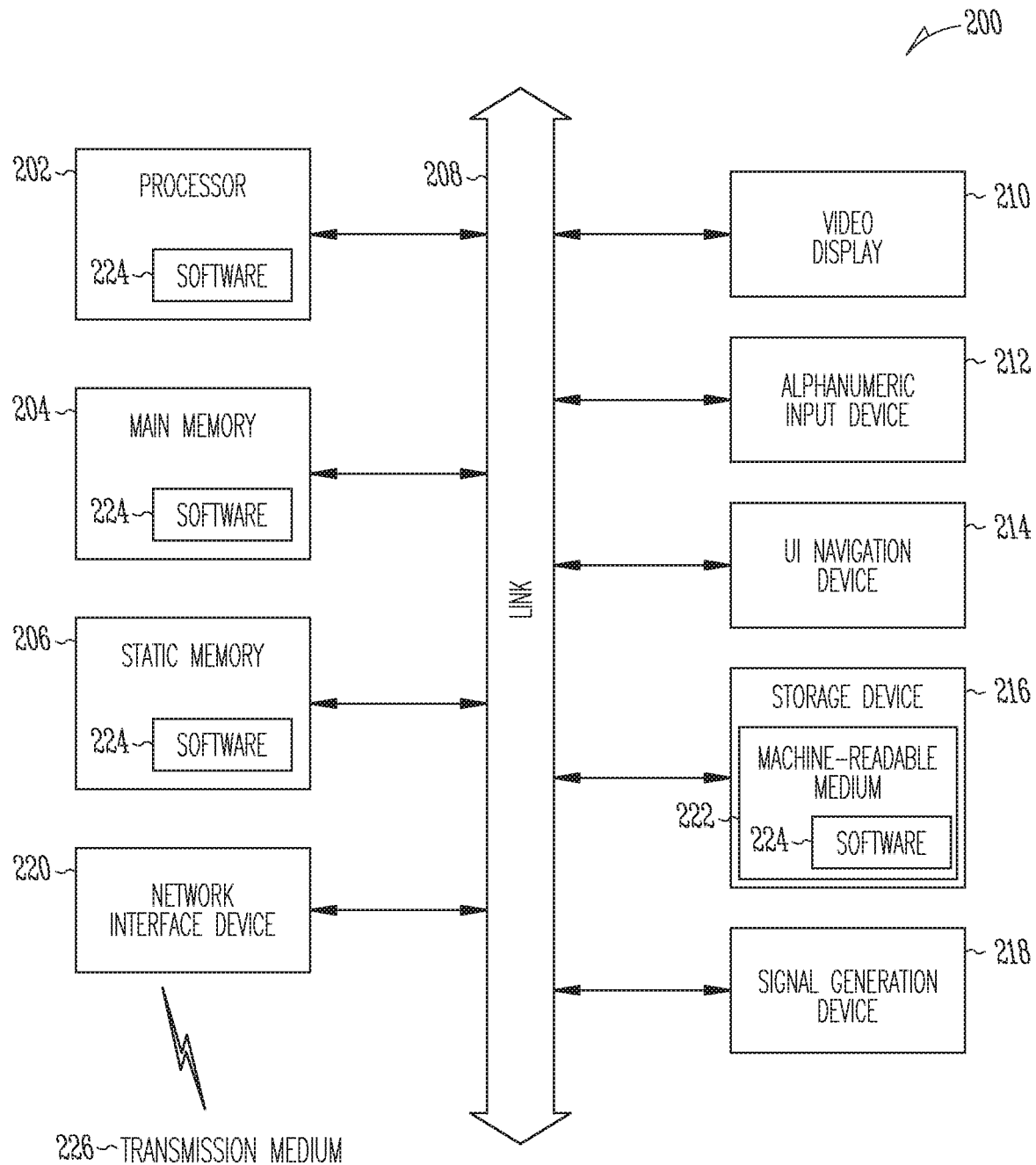
FIG. 2 illustrates a block diagram of a communication device in accordance with some aspects.

FIG. 2 illustrates a block diagram of a communication device in accordance with some aspects. In some aspects, the communication device 200 may be a personal or laptop computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. In some aspects, the communication device 200 may be embedded within other, non-communication based devices such as a drone.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a GPS sensor, compass, accelerometer, gyroscope or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only. Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

As above, in some aspects, position determination may be inadequate using techniques such as GPS alone. For example, the control of drones for safe operation may be highly dependent on a specific 3D location (with sub-meter accuracy) that is incapable of being determined by GPS. For example, standalone GPS has a typical error on the order of about 10 meters, with even larger vertical errors due to the satellite geometry, where the earth will block GPS signals. GPS positioning may be enhanced through the use of real-time kinematic (RTK) positioning. RTK uses measurements of the phase of the carrier wave of the GPS signal in addition to the information content of the GPS signal. RTK relies on a single reference station or interpolated virtual station to provide real-time corrections. However, RTK-based GPS receivers are expensive and thus unable to be used for commercial and low-cost deployment. Note that although drones are referred to below, the same concepts can be used for vehicles or other electronic devices having GPS and cellular communications, as well as camera, capabilities.

To produce results with the desired accuracy, while still providing a low-cost solution, multiple forms of positioning may be combined. In some aspects, to improve overall performance, BS ranging may be combined with GPS to provide better geometry of the anchor points and with redundancy in the number of anchors. Such measurements may be further combined across time using a camera-based Visual Inertial Odometry (VIO) solution may to further improve the accuracy. Visual odometry is the process of determining equivalent odometry information using sequential camera images to estimate the distance traveled. VIO may use an inertial measurement unit (IMU), which is an electronic device that measures and reports the specific force and angular rate of a device, and the magnetic field surrounding the device. IMU uses a combination of accelerometers and gyroscopes.

Thus, in aspects in which the device is a drone, ranging measurements from BSs may be combined with pseudorange measurements from GPS satellites along with measurements obtained from a camera and accelerometer sensors on the drone. In this case, different algorithms may be used to determine the position of the drone. The algorithms may be based on loose and tight coupling to combine the GPS measurements or the raw pseudorange measurements along with the base station ranging signals using to obtain a high accuracy positioning solution. The camera feeds may be combined with the accelerometer measurements to generate a VIO system that provides high accuracy displacement measurements across time. The combination of measurements and algorithm use may improve the vertical accuracy of GPS and the overall accuracy to less than a meter without the use of expensive RTK receivers. The positioning can be done on the drone side or the network side. High accuracy typically provides at most about a 1% error in terms of the distance for the VIO system, Each of the loose and tight coupling algorithms may have a tradeoff in implementation complexity vs. accuracy. Thus, the raw GPS, base station and camera measurements may be combined to obtain high accuracy location estimates using these algorithms.

The overall geometry of the system, along with increased bandwidth for ranging and high accuracy displacement measurements from the VIO system can lead to sub-meter accuracies. The geometry here is the location of the satellites and the base stations. The satellites are located in the sky and the base stations are on the earth surface, Thus, for the drone to be positioned the convex hull of the anchors are used, which is good for positioning purposes, especially in the vertical accuracy. This may be in particular useful when higher bandwidth 5G signals are transmitted by the base stations.

Different scenarios may exist for the base station ranging signals. In the first scenario, the ranging signal bandwidth is large enough to obtain highly precise OTDOA measurements. Examples include both the use of mmWave (which operates in the spectrum between 30 GHz and 300 GHz) in 5G systems and the eventual use of ultra-wideband (UWB) for base stations to facilitate ranging. The use of either may permit sub-meter accuracies to be achieved. In the second scenario, the existing LTE ranging signals may be used under the current 4G system. Under line-of-sight (LOS) assumptions as in the drone case, the GPS errors can be reduced by more than 50% to achieve a 1 m to 2 m error, To achieve this, precise synchronization between the different base stations may be used, for which GPS clocks are used with tight calibration of equipment delays.

The different proposed algorithms for combining GPS pseudorange with base station ranging signals and VIO measurements to provide improved positioning estimates will be described below in relation to the position of a drone. In particular, let $p_d=(x_0, y_0, z_0)$ be the true location of the drone at a given time instant (time notation is ignored for simplicity in the static case). Let $p_s=(x_s,y_s,z_s)$ be the location of the satellite s. The pseudorange measurement $\rho_{ds}$ between the GPS satellite and the drone is given by:

$$\rho_{ds}=\|p_d-p_s\|+c_{GPS}+n_{ds}$$

where $\|p_d-p_s\|$ is the norm of $p_d-p_s$ (distance between the true location of the drone and the satellite), $C_{GPS}$ is the clock offset of the GPS clocks with respect to the drone internal clock and $n_{ds}$ is the noise in the measurement. The noise in the measurement may include the thermal noise, as well as ionospheric and tropospheric errors (errors caused by differences in different locations in the ionosphere and troposphere through which the GPS signals pass). Some of these errors in the noise can be minimized using assisted (A-GPS) and dual-frequency GPS receivers.

Similarly, let $p_b=(x_b, y_b, z_b)$, be the location of base station b. The ranging measurement between the base station and the drone is given by:

$$\rho_{db}=\|p_d-p_b\|+c_{BS}+n_{db}$$

where $\|p_d-p_b\|$ is the norm of $p_d-p_b$, $c_{BS}$ is the clock offset of the base station clocks with respect to the drone internal clock and $n_{db}$ is the thermal noise in the measurement. In some aspects, the base station clocks may be synchronized with each other.

Figure 3:
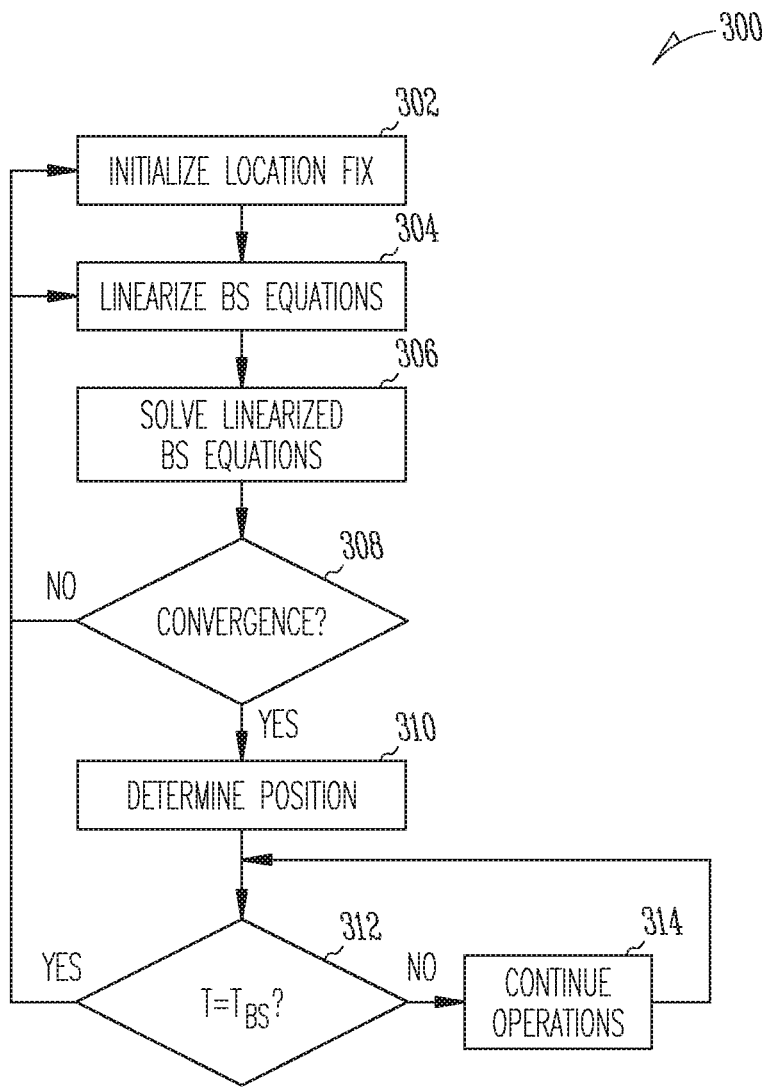
FIG. 3 illustrates a loose coupling algorithm in accordance with some aspects.

Further, let $\hat{p}_d^{GPS}$ be the fix obtained from GPS measurements. In this case, one aspect of the loose coupling algorithm may be shown in FIG. 3, which illustrates a loose coupling algorithm in accordance with some aspects. The loose coupling algorithm 300 may be performed at the drone or in the network (e.g., by the location server). In some aspects, other operations not shown in FIG. 3 may be present in the loose coupling algorithm 300. The loose coupling algorithm essentially separates the base station pseudorange measurements and the GPS measurements.

In operation 302, $\hat{p}_d$ and $\hat{c}_{BS}$ may be initialized. The clock offset initialization could be provided by the base stations based on previous computations by other drones. In some aspects, $\hat{p}_d(i)=\hat{p}_d^{GPS}$ (i.e., the initial position fix may be the GPS fix) and $\hat{c}_{BS}(i)=0$ (i.e., the initial clock offset of the base station clocks may be 0). Here, i is the iteration index, which is reset to 0 upon initialization of the loose coupling algorithm 300.

At operation 304, the base station equations may be linearized around $\hat{p}_d(i)$ and $\hat{c}_{BS}(i)$. That is, the linearization may be performed using each base station equation.

At operation 306, the linearized base station equations may be solved for mathematically to find a base station position. That is, the processor in the drone or location server may solve the linearized base station equations for $\hat{p}_d(i+1)$ and $\hat{c}_{BS}(i+1)$.

At operation 308, the processor may determine whether the solutions to the linearized base station equations converge. If not, the process may return to operation 304.

If at operation 308, the processor determines that the solutions to the linearized base station equations converge, at operation 310, the processor may determine the location of the drone from the converged solutions of the measurements from the different base stations. In addition, the processor may determine the clock offset of the different base stations from the converged solutions.

After a positional determination is made, the drone may continue to perform various operations until the next time to determine position via the base station signals ($t_{BS}$) has arrived. Thus, at operation 312, the drone may determine whether the base station positional determination time has arrived and if not continues operations at operation 314 until the next time to determine whether the base station positional determination time has arrived. If so, the process returns to operation 302.

In practice, in some aspects, the processor that receives and processes the base station signals may be disposed within a modem, which is separate from the GPS module(s) that receives and processes the GPS signals. In the loose coupling algorithm, as is apparent, interactions between the modem and the GPS modules may be avoided—except for the position fix information. However, any large error in the GPS position can negatively impact the converged solution, which can be in a far-away local minimum from the absolute minimum. The tight coupling algorithm mitigates this by jointly processing the GPS and base station pseudorange measurements simultaneously to solve for the position.

Figure 4:
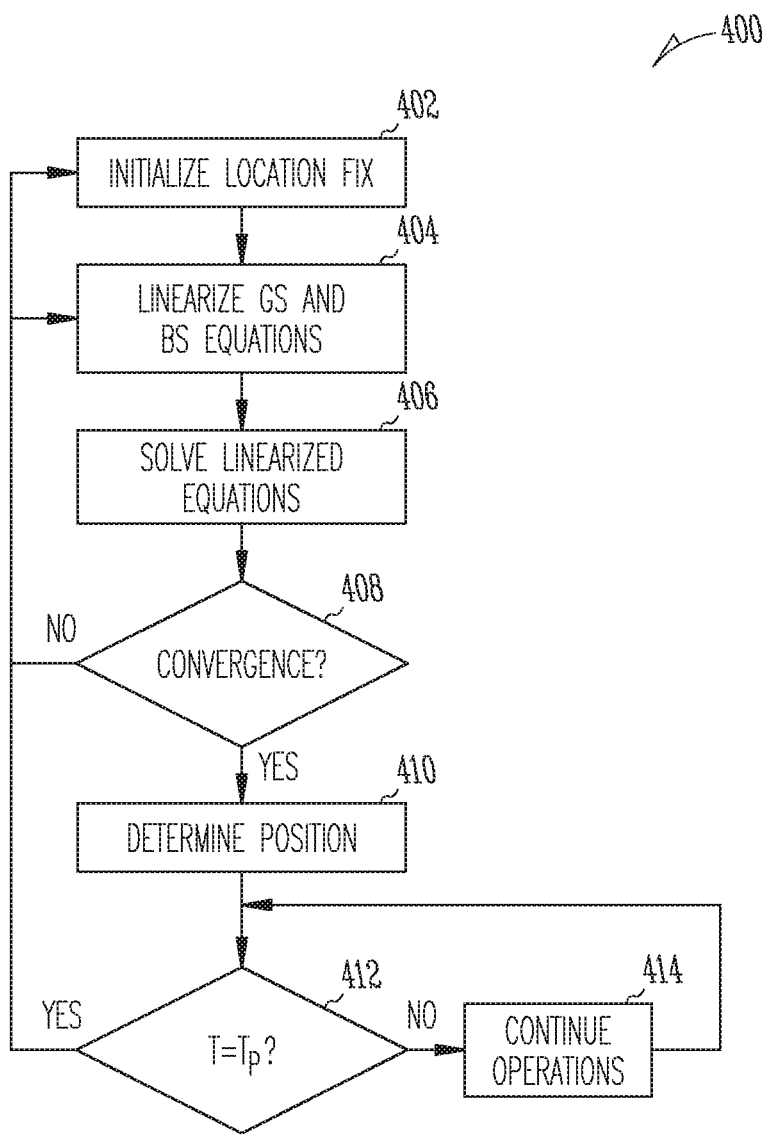
FIG. 4 illustrates a tight coupling algorithm in accordance with some aspects.

FIG. 4 illustrates a tight coupling algorithm in accordance with some aspects. The tight coupling algorithm 400 may be performed at the drone or in the network (e.g., by the location server). In some aspects, other operations not shown in FIG. 4 may be present in the tight coupling algorithm 400.

In operation 402, $\hat{p}_d$, $\hat{c}_{BS}$ and $\hat{c}_{GPS}$ may be initialized. In some aspects, unlike the loose coupling initial location, $\hat{p}_d(i)=0$ (i.e., the initial position may be null), $\hat{c}_{BS}(i)=0$ (i.e., the initial clock offset of the base station clocks may be 0) and $\hat{c}_{GPS}(i)=0$ (i.e., the initial clock offset of the GPS clocks may be 0). As above, i is the iteration index, which is reset to 0 upon initialization of the tight coupling algorithm 400.

At operation 404, both the GPS and base station equations may be linearized around $\hat{p}_d(i)$, $\hat{c}_{BS}(i)$ and $\hat{c}_{GPS}(i)$. That is, the linearization may be performed using the equation for each base station measurement and each GPS measurement.

At operation 406, the linearized equations may be incremented and solved for mathematically. That is, the processor in the drone or location server may solve the linearized equations for $\hat{p}_d(i+1)$, $\hat{c}_{BS}(i+1)$ and $\hat{c}_{GPS}(i+1)$.

At operation 408, the processor may determine whether the solutions to the linearized equations converge. To converge, the processor may determine whether the estimated position of the current iteration is within a predetermined tolerance from the estimated position of the last iteration. This may be determined by complexity or computation power of the processor, for example, or by the application or use. For example, the tolerance may be 1 m, 0.5 m, 0.1 m etc. . . . If not, the process may return to operation 404.

If at operation 408, the processor determines that the solutions to the linearized equations converge, at operation 410, the processor may determine the location of the drone from the converged solutions of the measurements from the different base stations and the different GPS satellites. In addition, the processor may determine the clock offset of the different base stations and GPS satellites from the converged solutions.

After a positional determination is made, the drone may continue to perform various operations until the next time to determine position via the base station and GPS signals ($t_p$) has arrived. Thus, at operation 412, the drone may determine whether the positional determination time has arrived and if not continues operations at operation 414 until the next time to determine whether the positional determination time has arrived. If so, the process returns to operation 402.

One of the implementation challenges is that the transmission time instant of the GPS pseudorange and that of the base station OTDOA measurements are different. During this time, the location of the drone could have changed. To account for this, the measurements from a VIO may be incremented to combine the measurements across time. A VIO may provide the displacement measurements to couple the positions across time.

To this end, let δd be the displacement of the drone between the base station and the GPS measurement time instants. This gives the following equations at any time instant:

$$\rho_{ds} = \|p_d - p_s\| + c_{GPS} + n_{ds}$$

$$\rho_{db} = \|p_d + \delta d - p_b\| + c_{BS} + n_{db}$$

where the variables are the same as above. The VIO may provide an estimate of the displacement $\widehat{\delta d}$ based on the velocity, acceleration and camera feeds across time. These equations can now be linearized around the position $p_d$ and the displacement estimate can be substituted for the true displacement and the tight and loose coupling algorithms can be used to obtain the location estimate. In general, an Extended Kalman Filter can be designed to obtain a sequence of position estimates using the base station, GPS and VIO measurement across time instants. As equations are linear in the unknowns and the noise is assumed to be Gaussian, filtering the measurements obtained across time is a classical Kalman filtering problem. The state variables across time are linked using the VIO.

The above algorithms work well when in LOS conditions and the noise is low. If the thermal noise is high, convergence of the equations might be to a local minimum that might be bad. Under this scenario, multiple measurements can be integrated across time using the VIO measurements. Below is a general sequence of algorithmic steps to combine the sequence of measurements across time for both GPS and base station ranging measurements using VIO. The GPS, BS and VIO measurements that obtained are:

$$\rho_{ds}(t_1) = \|p_d(t_1) - p_s(t_1)\| + c_{GPS} + n_{ds}$$

$$\rho_{db}(t_2) = \|p_d(t_2) - p_b\| + c_{BS} + n_{db}$$

$$\widehat{\delta d}(\Delta t) = \|p_d(t) - p_d(t')\| + n_d$$

where $\widehat{\delta d}(\Delta t)$ is estimate of the displacement between the drone positions at time t and t'. Assuming that the VIO can provide this displacement estimate at a much finer timescale as compared to the other two measurements, which is a reasonable assumption since the accelerometer sampling rate can be high and the camera measurements are used to calibrate the bias which can be slower, both of the time scales faster than the time differences between the base station and GPS satellite signal reception. In this case, the tight coupling algorithm can be modified to provide a time-extended tight coupling algorithm. In the time-extended tight coupling algorithm, at time t, the measurements $\{\rho_{ds}(t_1), \rho_{db}(t_2), \widehat{\delta d}(\Delta t)\}_{t_1 \leq t, t_2 \leq t}$ may be collected, in which the GPS and base station measurements are collected before the VIO measurement. The different equations are then linearized around $p_d(t)$ by expressing the rest of the equations as a function of $p_d(t)$ and $\widehat{\delta d}(\Delta t)$. The equations and clock biases are subsequently solved iteratively as in the Tight Coupling Algorithm shown in FIG. 4.

In one example, 3 GPS satellites and 3 base stations and 2 time instants are assumed and that the available measurements and calculations are performed at the device. The device may determine:

1) from the GPS satellites: $\rho_{ds}(t) = \|p_d(t) - p_s\| + c_{GPS} + n_{ds}$, where t=0,1, s=1,2,3
2) from the base stations: $\rho_{db}(t) = \|p_d(t) - p_b\| + c_{BS} + n_{ds}$, where t=0,1, b=1,2,3
3) from the VIO: $\widehat{\delta d_t} = \delta d_t + n_{vio}$, where $\delta d_t = p_d(t) - p_d(t-1)$ and t=1.

One goal is to estimate $p_d(t)$ for all t. At time 1:

$$\rho_{ds}(1) = \|p_d(0) + \delta d_1 - p_s\| + c_{GPS} + n_{ds}$$

$$\rho_{db}(1) = \|p_d(0) + \delta d_1 - p_b\| + c_{BS} + n_{ds}$$

Let $p^0$ be the initial estimate of the position. This could be any location. The above non-linear equations are linearized around this point. Let $p_d(0) = [x_d, y_d, z_d]$ and $p^0 = [x_0, y_0, z_0]$. Consider the following equation:

$$\rho_{ds}(0) = \|p_d(0) - p_s\| + c_{GPS} + n_{ds}$$

A first order Taylors expansion around $p^0$ will provide, for the GPS position:

$$\rho_{ds}(0) = \|p^0 - p_s\| + (x_d - x_0)\left(\frac{x_0 - x_s}{\|p^0 - p_s\|}\right) + (y_d - y_0)\left(\frac{y_0 - y_s}{\|p^0 - p_s\|}\right) + (z_d - z_0)\left(\frac{z_0 - z_s}{\|p^0 - p_s\|}\right) + c_{GPS} + n_{ds}$$

Similarly, a first order Taylors expansion around $p^0$ provide, for the base station position:

$$\rho_{db}(0) = \|p^0 - p_b\| + (x_d - x_0)\left(\frac{x_0 - x_b}{\|p^0 - p_b\|}\right) + (y_d - y_0)\left(\frac{y_0 - y_b}{\|p^0 - p_b\|}\right) + (z_d - z_0)\left(\frac{z_0 - z_b}{\|p^0 - p_b\|}\right) + c_{BS} + n_{ds}$$

The equations for time 1 can all be expanded similarly, around $p^0$. For time 1, however, $\delta d_1$ is replaced by the VIO measurement $\widehat{\delta d_1}$. Note that in the above set of equations, the unknowns are $(x_d, y_d, z_d)$, $C_{GPS}$, $C_{BS}$, while the observed measurements are $(\rho_{ds}(t), \rho_{db}(t), \widehat{\delta d}(t))$. As the equations are linear in the unknowns, a least squares method can be used to estimate the unknowns.

Thus, whether the loose or tight coupling algorithm is used, the desired the equations are linearized around $p^0$. This may result in a set of equations of the form y=Ax+n where the matrix A is obtained from stacking all the linear equations, x is the set of unknowns to be estimated and y are the set of observations. The solution to the linear equations, using a least squares approach, is $\hat{x} = (A^t A)^{-1} A^t y$. The error covariance matrix in estimation is given by $\sigma^2 (A^t A)^{-1}$, where $\sigma^2$ is the noise variance in the measurements, assuming the same noise variance. The above steps are then repeated, with $p^0$ updated to the estimated value, and the repetitions continued until the estimated position does not change much between iterations. The amount of acceptable change can be dependent on the desired error, say 1 m.

The complexity of time-extended tight coupling algorithm can be significant when combining measurements across time. One option is to consider measurements in a given time window and execute the iterations. Another option is to replace the iterative solving in the time-extended tight coupling algorithm with a Kalman Filter. In this case, the complexity can be reduced by only keeping track of the state variables (position and the clock biases here) and the covariance matrices.

For implementation, there are at least two scenarios. In a first scenario, the drone computes the position estimate based on all the reference signals. For this, the clocks across the different base stations should be tightly synchronized, errors should be less than 1 ns to achieve the desired accuracies. This can be accomplished through high quality GPS synchronized clocks. In addition, the PRS signals can be transmitted at the GPS signal transmission instants. This may minimize the receiver complexity. If the PRS signals are transmitted at other times, the timestamps of the PRS signals may be transmitted or otherwise predetermined. Further, the clock drift and clock offset parameters of the base stations can be transmitted to the drone to enable accurate estimation of the clock offset and, in turn, the position of the drone. The base station can also specify the number of iterations or the time window over which the measurements are to be integrated to obtain a position estimation. These may be a function of the accuracy requirement of the location error and is a tradeoff in terms of complexity. For example, when the drone traffic is much lower, the base station might not be able to use a less accurate position estimate and thereby can specify that the drone use a smaller number of iterations and/or time window for computation.

In a second scenario, the drone position may be computed by the cellular network. This can be for regulatory and tracking purposes. In this case the drone may transmit the raw GPS pseudorange measurements or the GPS fix, depending on the type of algorithm being used. The drone may also transmit the time differences of the base station OTDOA measurements to a reference base station. The VIO measurements for the duration of flight between the GPS pseudorange and the base station OTDOA measurements may also be reported to the reference base station. The amount of information to be transmitted can be reduced depending on the accuracy requirement of the positioning. For example, the most basic information that the drone can transmit to a reference eNB can be limited to the GPS measurements. For higher accuracy, the base station can request the drone to also transmit the raw pseudoranges, the base station OTDOA measurements and the inertial navigation system measurements.

To this extent, changes to the LTE Positioning Protocol (LPP) may be made. In particular, a new element (called herein enhanced multimodal positioning) may be defined to request enhanced positioning capability from the UE. During attachment, the network may request the positioning capability from the UE using the RequestCapabilities IE.

```
-- ASN1START
RequestCapabilities ::= SEQUENCE {
    criticalExtensions   CHOICE {
        c1                       CHOICE {
            requestCapabilities-r9   RequestCapabilities-r9-IEs,
            spare3 NULL, spare2 NULL, spare1 NULL
        },
        criticalExtensionsFuture SEQUENCE { }
    }
}
RequestCapabilities-r9-IEs ::= SEQUENCE {
    commonIEsRequestCapabilities   CommonIEsRequestCapabilities   OPTIONAL, -- Need ON
    a-gnss-RequestCapabilities   A-GNSS-RequestCapabilities     OPTIONAL, -- Need ON
    otdoa-RequestCapabilities   OTDOA-RequestCapabilities       OPTIONAL, -- Need ON
    ecid-RequestCapabilities   ECID-RequestCapabilities   OPTIONAL, -- Need ON
    epdu-RequestCapabilities   EPDU-Sequence                OPTIONAL,   -- Need ON
    emp-RequestCapabilities EMP-RequestCapabilities - RequestCapabilities     OPTIONAL,   -- Need ON
    ...,
    [[ sensor-RequestCapabilities-r13   Sensor-RequestCapabilities-r13   OPTIONAL,   -- Need ON-
    tbs-RequestCapabilities-r13   TBS-RequestCapabilities-r13   OPTIONAL,   -- Need ON
    wlan-RequestCapabilities-r13 WLAN-RequestCapabilities-r13   OPTIONAL, -- Need ON
    bt-RequestCapabdities-r13   BT-RequestCapabilities-r13   OPTIONAL   -- Need ON
    ]]
}
-- ASN1STOP
```

The UE may respond with its capabilities to enable the EMP positioning method.

```
-- ASN1START
ProvideCapabilities ::= SEQUENCE {
    criticalExtensions   CHOICE {
        c1                       CHOICE {
            provideCapabilities-r9   ProvideCapabilities-r9-IEs,
            spare3 NULL, spare2 NULL, spare1 NULL
        },
```

-continued

```
        criticalExtensionsFuture  SEQUENCE { }
    }
}
ProvideCapabilities-r9-IEs ::= SEQUENCE {
    commonIEsProvideCapabilities    CommonIEsProvideCapabilities    OPTIONAL,
    a-gnss-ProvideCapabilities      A-GNSS-ProvideCapabilities      OPTIONAL,
    otdoa-ProvideCapabilities       OTDOA-ProvideCapabilities       OPTIONAL,
    ecid-ProvideCapabilities        ECID-ProvideCapabilities        OPTIONAL,
    epdu-ProvideCapabilities        EPDU-Sequence                   OPTIONAL,
    emp-ProvideCapabilities         EMPProvideCapabilities
...,
[[ sensor-ProvideCapabilities-r13  Sensor-ProvideCapabilities-r13  OPTIONAL,
    tbs-ProvideCapabilities-r13     TBS-ProvideCapabilities-r13    OPTIONAL,
    wlan-ProvideCapabilities-r13    WLAN-ProvideCapabilities-r13   OPTIONAL,
    bt-ProvideCapabilities-r13      BT-ProvideCapabilities-r13     OPTIONAL
    ]]
}
-- ASN1STOP
```

The EMP-ProvideCapabilities IE indicates the types of information that can be combined in addition to all the capabilities of OTDOA and GNSS. Further, the EMP-ProvideCapabilities IE may also indicate the type of information from the eNB that the UE is to combine (such as multipath information, clock models etc).

| EMP-ProvideCapabilities additional field descriptions |
| --- |
| EMP-sensors |
| This field indicates the target set of sensors that are supported by the device for positioning. An exampel list of sensors include cameras, visual inertial odometer (VIO), accelerometers and barometer. The VIO is a virtual sensor which is based on the camera feeds and provides the displacement information that can be much more accurate than the acceleration/velocity measurements. These values are necessary to integrate the GNSS and BS measurements obtained at different time instants. A further granuarity would indicate the standard deviation and error models for these sensors (e.g. the Cross correlation error matrix from a Kalman filter that generates the VIO measurements). |
| EMP-environment |
| This field indicates the error models that the UE supports for each of the sensor/measurement data. For example, the UE might be able to integrate much finer multipath error metrics for the base station range measurements. This might prompt the eNB to be able to send a finer multipath distribution for the base station range measurements for each of the base stations based on the coarse UE location, The eNB might also be able to send multipath error distribtions for the satellite measurements for the UE at the given location based on past information |

The UE may also request assistance data from the eNB for enhanced positioning. The following types of assistance data may be useful to improve positioning accuracy:

| EMP-RequestAssistaneeData field descriptions |
| --- |
| ClockErr |
| This field specifies the clock drift and err parameters for the base station clocks. The base stations can maintain an error model for their clocks that is updated over time. The parameters of such a model is sent to the UE, For example, when every UE obtains a position estimate, it also computes the clock offset of the base station clocks which can be transmitted to the eNB as part of the position estimate which is in turn used by the BS to update its clock model. |
| PR-env |
| This field specifies the ranging environment error model for the base station ranging signals as well as the GNSS measurements received by the UE at a given position. The eNB maintains a table of coarse locations and multipath error profiles for all the measurements at that location including the GNSS measurements. The error distribution can be transmitted to the UE which can be further incorporated in the algorithm to improve positioning, |

| EMP-RequestAssistanceData field descriptions |
| --- |
| AlgParam |
| This field specifies the number of iterations, time window over which the measurements are integrated by the VIO. A larger time window always increases the accuracy at the expense of higher complexity. Using a pre-determined table of time windows and accuracies the eNB accordingly transmits these parameters. |

The eNB can also request for the location information data from the UE with the new positioning method. This may be included as part of the RequestLocationInformation IE.

```
RequestLocationInformation-r9-IEs ::=SEQUENCE {
    commonIEsRequestLocationnformation
    CommonIEsRequestLocationInformation         OPTIONAL,   -- Need ON
    a-gnss-RequestLocationInformation           A-GNSS-RequestLocationInformation
    OPTIONAL,   -- Need ON
    otdoa-RequestLocationInformation OTDOA-RequestLocationInformation
    OPTIONAL,   -- Need ON
    ecid-RequestLocationInformation             ECID-RequestLocationInformation
    OPTIONAL,   -- Need ON
    emp-RequestLocationInformation              EMP-RequestLocationInformation
    OPTIONAL,   -- Need ON
    epdu-RequestLocationInformation             EPDU-Sequence
                OPTIONAL,   -- Need ON
    ...,
    [[
    sensor-RequestLocationInformation-r13
    Sensor-RequestLocationInformation-r13
                                                                         OPTIONAL,
    -- Need ON
    tbs-RequestLocationInformation-r13          TBS-RequestLocationInformation-r13
    OPTIONAL,   -- Need ON
    wlan-RequestLocationInformation-r13         WLAN-RequestLocationInformation-r13
    OPTIONAL,   -- Need ON
    bt-RequestLocationInformation-r13 BT-RequestLocationInformation-r13
    OPTIONAL    -- Need ON
    ]]
}
```

| RequestLocationInformation field descriptions |
| --- |
| commonIEsRequestLocationInformation |
| This field specifies the location information type requested by the location server and optionally other configuration information associated with the requested location information. Further, under the multi-modal position, the eNB can also request the residual clock estimates from the U.E. It can also request any multipath environment estimates the UE after processing all the measurements. |

In response, the UE may provide the location information based on the new method.

```
ProvideLocationInformation-r9-IEs ::= SEQUENCE {
    commonIEsProvideLocationInformation
    CommonIEsProvideLocationInformation     OPTIONAL,
    a-gnss-ProvideLocationInformationA-GNSS-ProvideLocationInformation
    OPTIONAL,
    otdoa-ProvideLocationInformation OTDOA-ProvideLocationInformation
    OPTIONAL,
    ecid-ProvideLocationInformation         ECID-ProvideLocationInformation
    OPTIONAL,
    epdu-ProvideLocationInformation         EPDU-Sequence
                OPTIONAL,
    emp-ProvideLocationInformation  EMP-ProvideLocationInformation    OPTIONAL,
    ...,
    [[
    sensor-ProvideLocationInformation-r13
    Sensor-ProvideLocationInformation-r13
                                                                         OPTIONAL,
    tbs-ProvideLocationInformation-r13   TBS-ProvideLocationInformation-r13
```

```
    OPTIONAL,
    wlan-ProvideLocationInformation-r13    WLAN-ProvideLocationInformation-r13
    OPTIONAL,
    bt-ProvideLocationInformation-r13 BT-ProvideLocationInformation-r13
    OPTIONAL
    ]]
  }
  -- ASN1STOP
```

The algorithms were implemented in a simulator to show the performance improvements. A SatNav MATLAB GPS toolbox was used to simulate the satellite positions, GPS pseudoranges at a given time and location. This also includes the standard GPS errors (such as ionospheric errors, tropospheric errors) in the measurements. The Golden SLS simulator from NGS was used to simulate the positions of the base stations. A single drone position was simulated in 3D at a particular location on the earth and the base stations simulated around this location.

Figure 5:
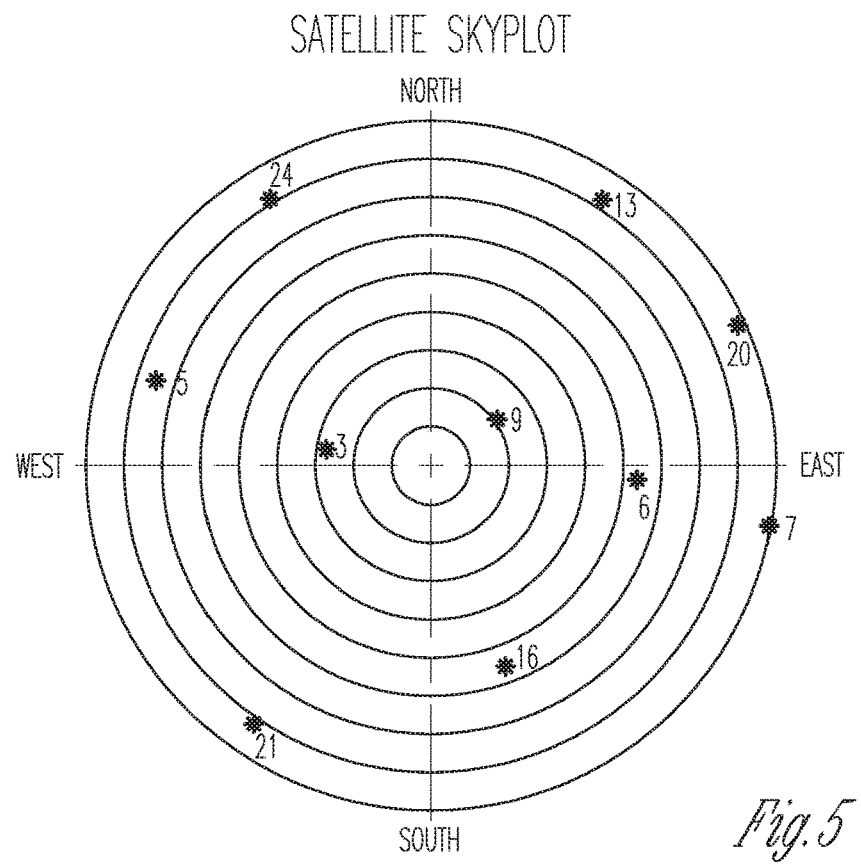
FIG. 5 illustrates a simulated plot of satellite .cations in accordance with some aspects.
Figure 6:
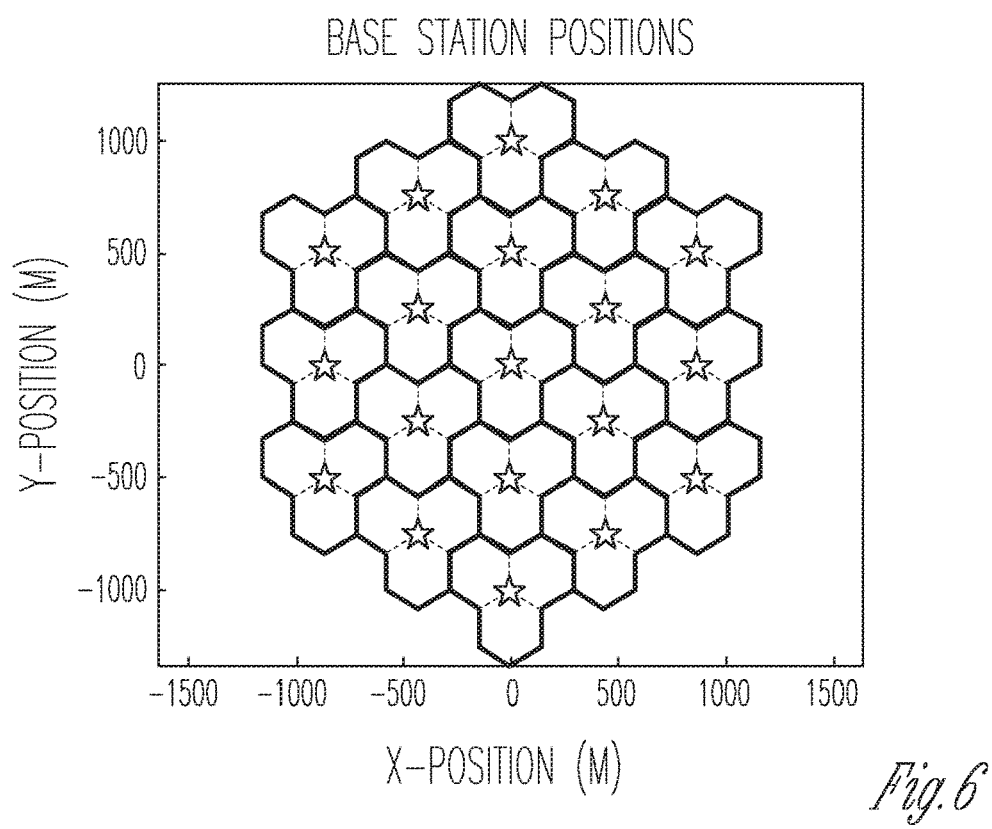
FIG. 6 illustrates a simulated position plot of base stations in accordance with some aspects.

A simple LOS scenario is considered. The GPS error scaling factors were chosen in such a way that the error is in the range of 5 m to 10 m. The drone location is simulated around a (lat,lon)=[45.5229, −1229898] and a height of 200 m. The GPS satellite constellation was simulated at a GPS time of week 319602. FIG. 5 shows a simulated plot of the satellite locations in accordance with some aspects. The different rings in the plot shown in FIG. 5 correspond to different GPS mask angles in the progression of 10 degrees. A mask angle of 10 degrees was used for positioning in the simulations. The base station positions were simulated from the Golden SLS simulator. FIG. 6 shows a simulated position plot of the base stations in accordance with some aspects.

Figure 7A:
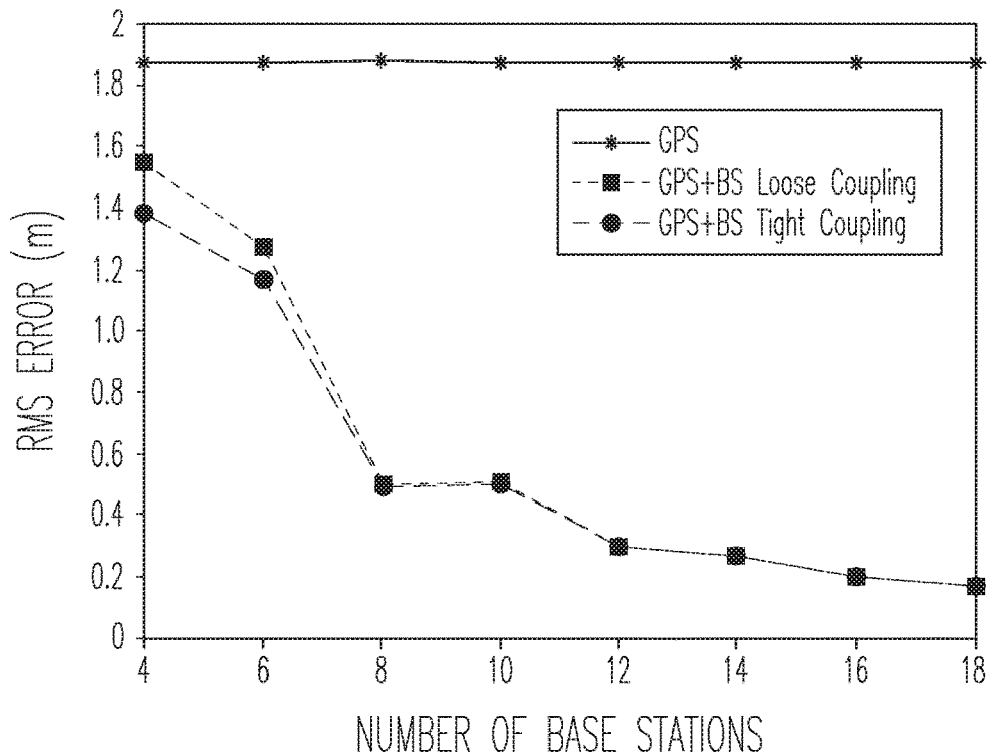
FIGS. 7A-7D illustrate 5G error performance for loose and tight coupling algorithms in accordance with some aspects.
Figure 7B:
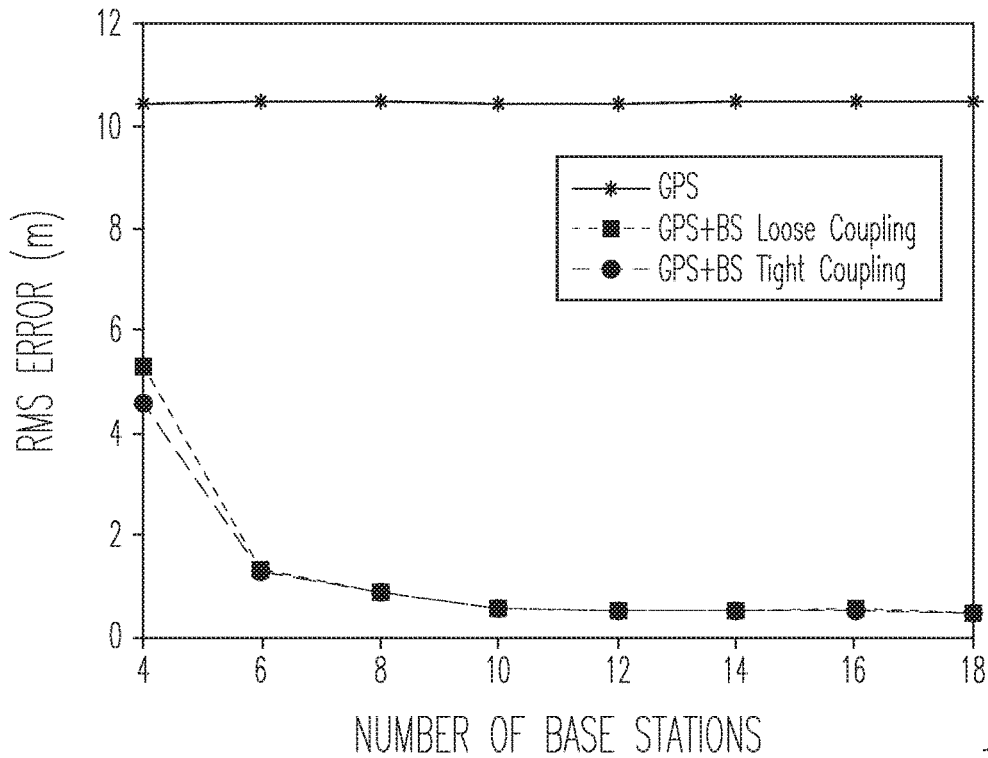
Figure 7C:
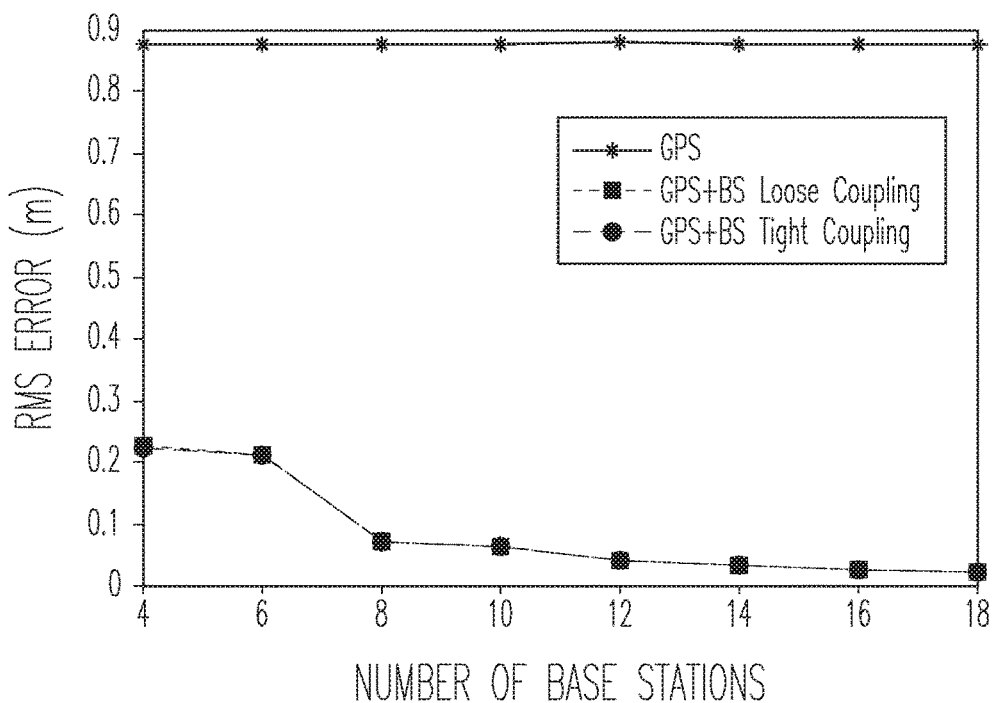
Figure 7D:
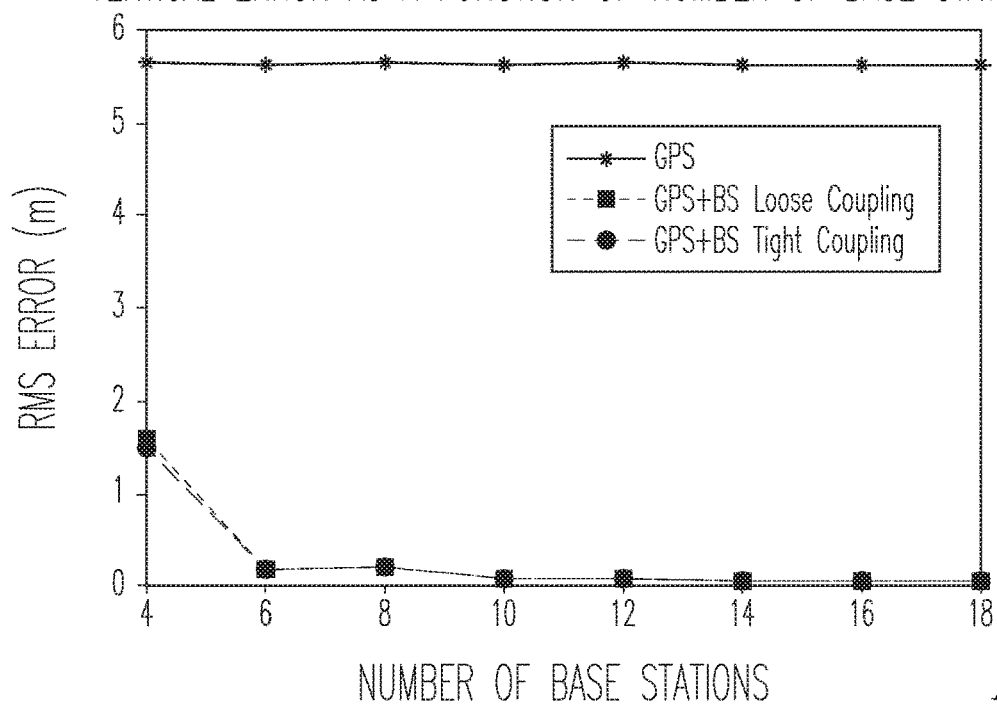

For 5G and UWB scenario, the base station signals are assumed to have a ranging bandwidth of 500 MHz. The error on the measurements was chosen to have a standard deviation of 0.3 m in a conservative scenario. This value was extrapolated from errors in LTE for different bandwidths. The error performance for 5G and UWB is shown in FIGS. 7A and 7B for the loose and tight coupling algorithms, in accordance with some aspects. As can be seen, the errors are below a meter both horizontally and vertically. If a 1 GHz system is assumed, with an optimistic theoretical LOS error for ranging of 0.05 m, less than 0.1 m error can potentially be achieved. This is shown in FIGS. 7C and 7D for the loose and tight coupling algorithms.

Figure 8A:
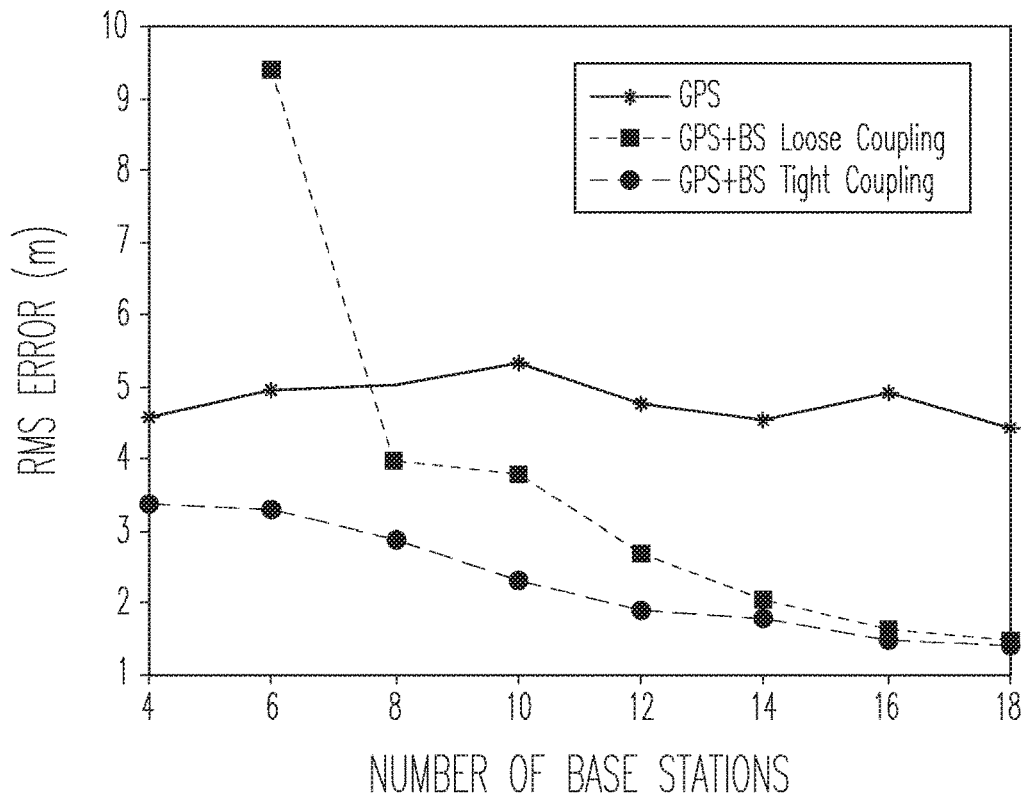
FIGS. 8A-8C illustrate 4G error performance for loose and tight coupling algorithms in accordance with some aspects.
Figure 8B:
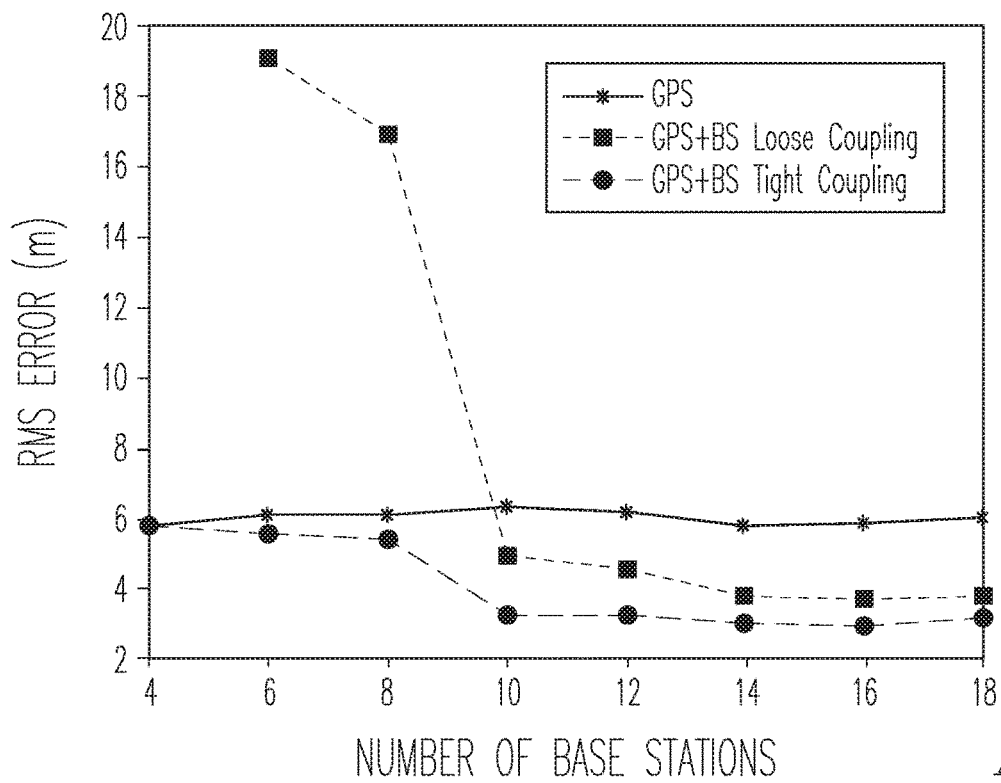
Figure 8C:
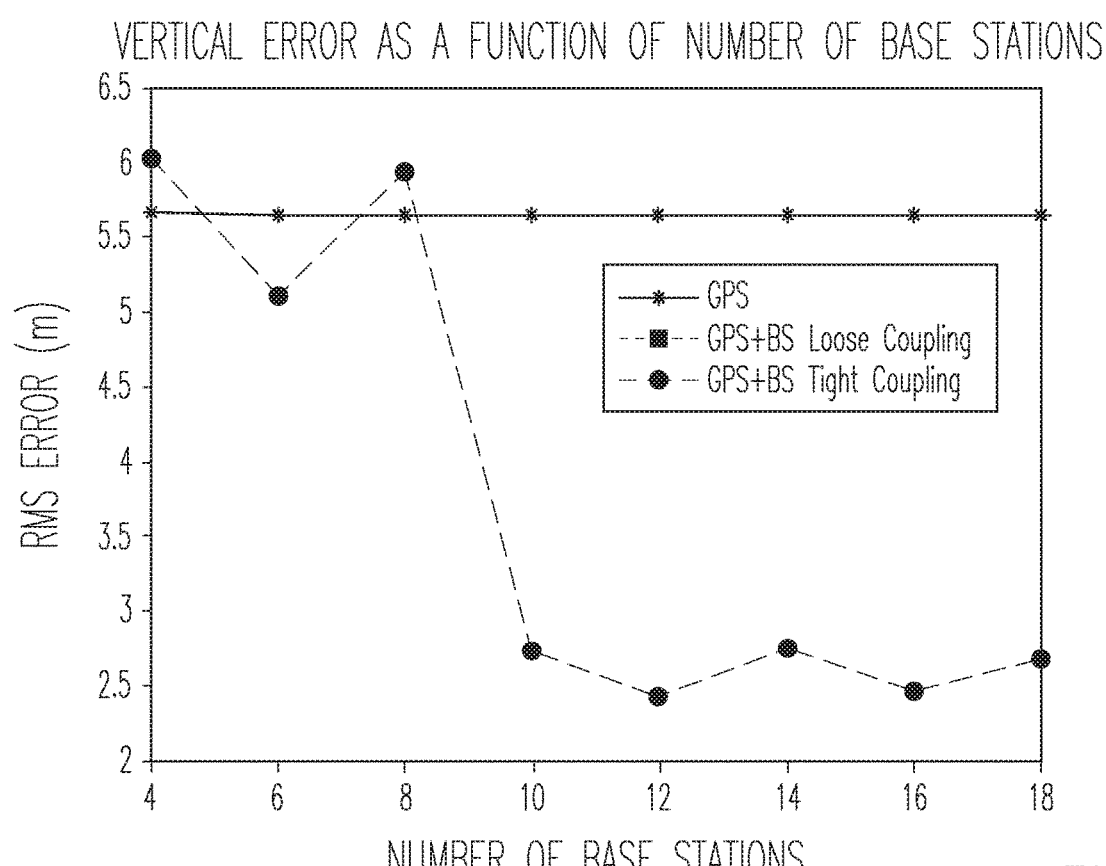
Figure 9A:
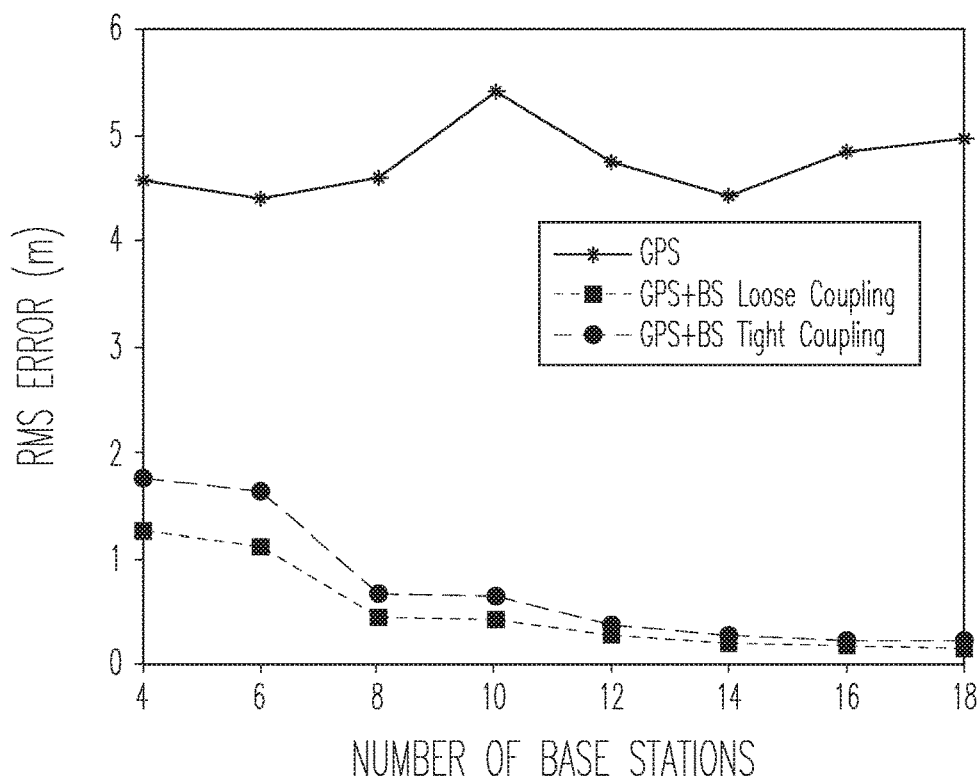
FIGS. 9A and 9B illustrate 500 MHz 5G error performance for loose and tight coupling algorithms in accordance with some aspects.
Figure 9B:
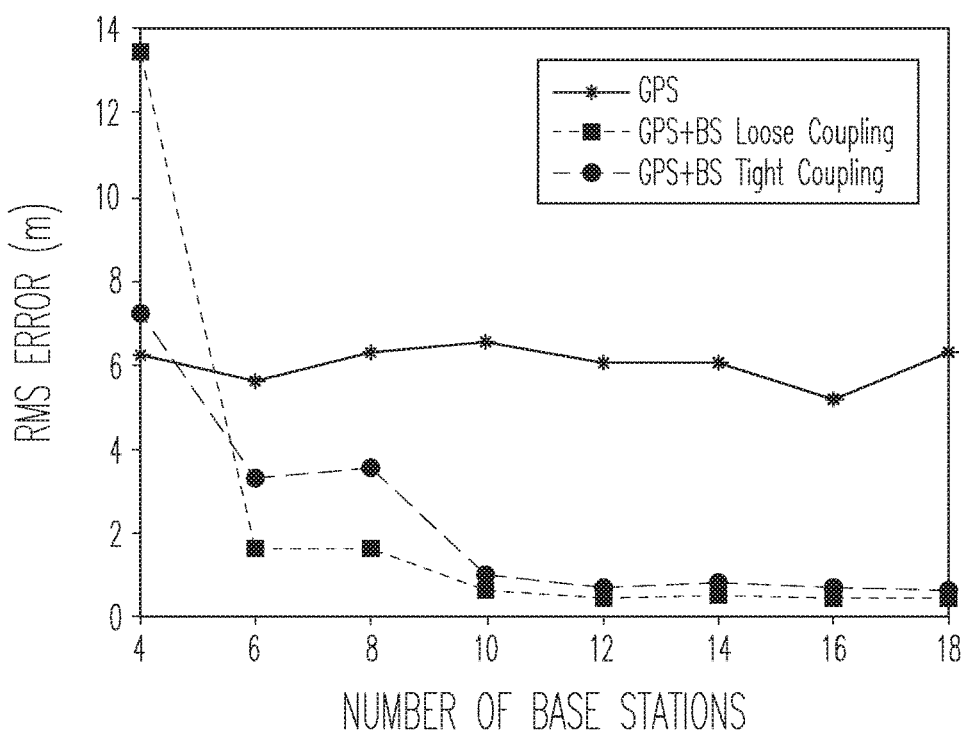
Figure 10:
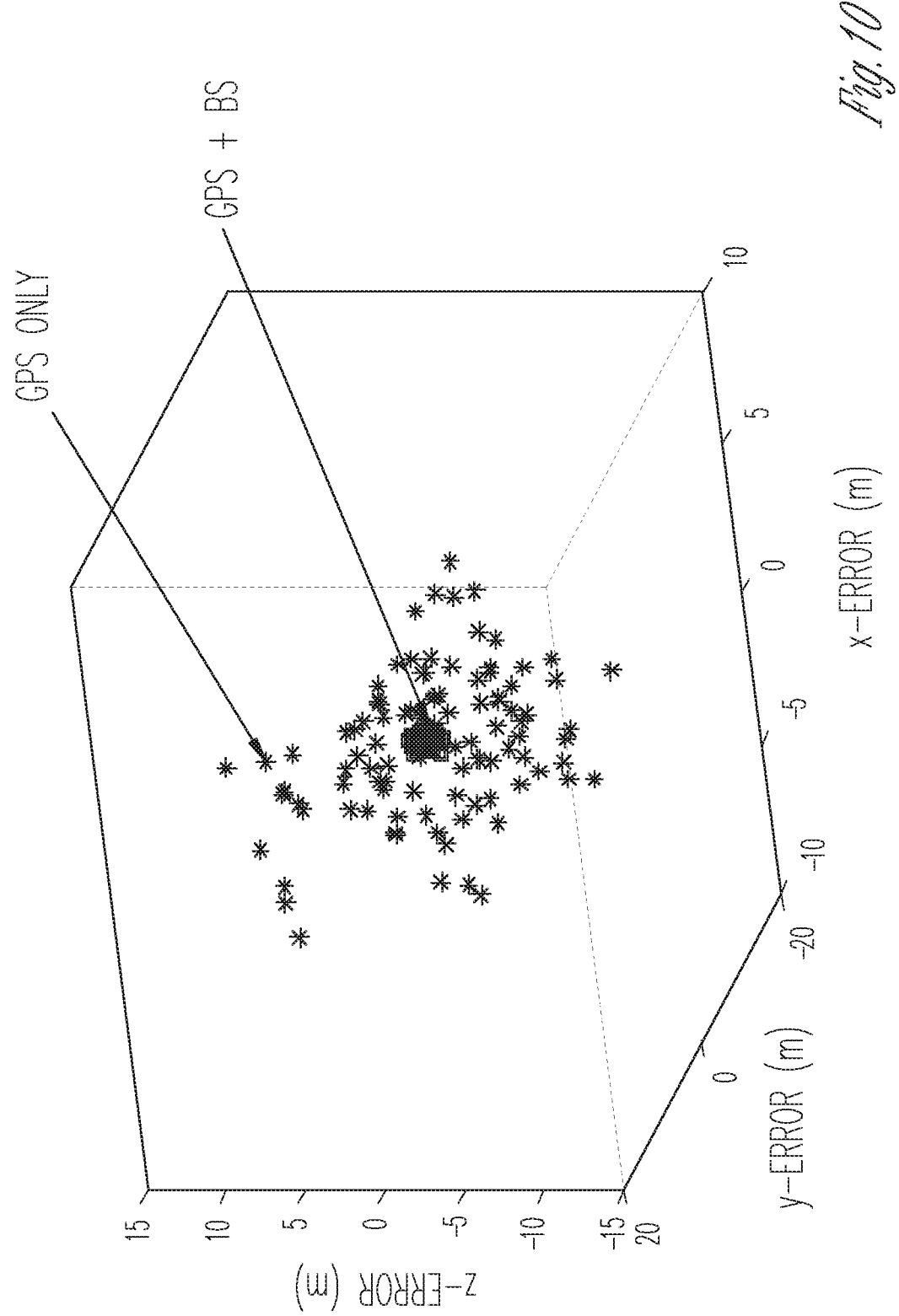
FIG. 10 illustrates a simulated plot of GPS errors in accordance with some aspects.

In the second set of simulations, a 4G scenario is assumed with existing base stations. The base stations are assumed to be perfectly synchronized. An optimistic error of 1.5 m on the ranging measurements is assumed under perfect LOS scenario. In this case, as shown, the vertical error can be reduced by 50%. These are shown in FIGS. 8A-8C for the loose and tight coupling algorithms, in accordance with some aspects.

in the previous plots, the GPS errors were chosen such that the thermal noise is small but the ionospheric and tropospheric errors are larger. If dual-frequency receivers were present in the drone, then the ionospheric errors can be mitigated. In this case, if it is assumed that the thermal noise is larger for GPS, FIGS. 9A and 9B are obtained for a 500 MHz 5G scenario. FIG. 10 shows a simulated plot of GPS errors from 100 different iterations compared to the position fixes after combining GPS and base station ranging signals. The drone location is fixed for all these 100 iterations.

In addition to the challenges associated with the combining of multiple types of measurements, precise positioning of autonomous systems like drones and cars is a challenging task particularly in environments where multipath effects may corrupt the ranging measurements from GPS and/or cellular base stations. Multipath is a serious concern in settings where there are many reflectors (e.g. urban canyon environments, close to buildings etc). For example, when a drone is inspecting an oil rig and is flying close to the rig, the ranging signals from the base stations and GPS tend to get reflected off the rig, providing erroneous results in the measurements. When autonomous cars are navigating in dense urban canyons, such as Manhattan, the multipath errors are significant. When multipath reflections are present, large errors in a few of the measurements can cause significant errors in the position even when complex LOS algorithms are used. Multipath reflections may increase the errors to cause positioning errors as large as about 100 m. For autonomous vehicle operation, current solutions make use of high cost LiDAR and other sensors to mitigate the effects of multipath. To reduce the cost or improve the results, it would be desirable to augment or eliminate LiDAR-based solutions. To mitigate multipath errors, measurements that are multipath free should be identified. Once these measurements are identified, they may be used to obtain a good position estimate.

Figure 11:
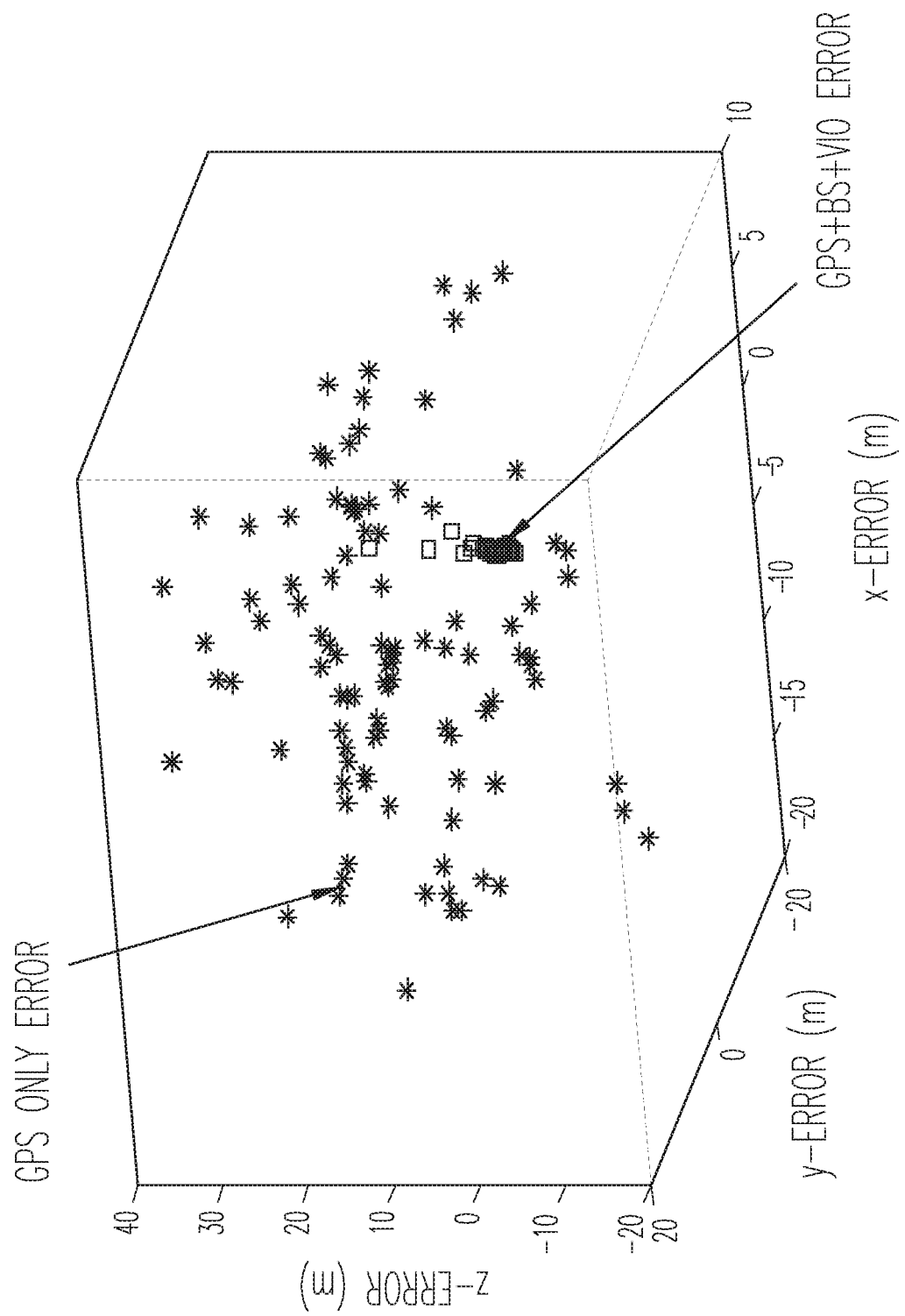
FIG. 11 illustrates a simulated error plot in accordance with some aspects.

FIG. 11 shows a simulated error plot in accordance with some aspects. In particular, FIG. 11 shows error with GPS only and error with algorithms fusing with GPS, BS and VIO measurements. In short, in some aspects, the combination of measurements from multiple entities may enable rejection of multipath corrupted measurements. Algorithm described below provides steps to exploit redundancy and geometrical consistency fused with camera-based VIO measurements to obtain high accurate position estimates.

In particular, multipath-free measurements give a consistent solution while measurements with multipath are inconsistent due to the geometrical nature of the problem. Each ranging measurement defines a circle (sphere) and three or more circles intersect only at a single point if they are from noiseless measurements. However, when measurements are multipath corrupted, they do not intersect. Furthermore, amongst all the measurements obtained across space and time, which measurements are good and which are multipath corrupted may be unknown. It is this ambiguity that causes significant errors in the position estimate. A geometrical constraint can thus be used to enable a consistency check across the measurements so that the final positioning solution is only a function of the good measurements, and thereby, highly accurate. To do this across space and time, the camera-based VIO measurements may be used to help weed out multipath corrupted measurements. The algorithm for multipath rejection thus uses a combination of GPS, BS ranging and camera and accelerometer measurements to obtain a high accuracy position estimate.

Figure 12:
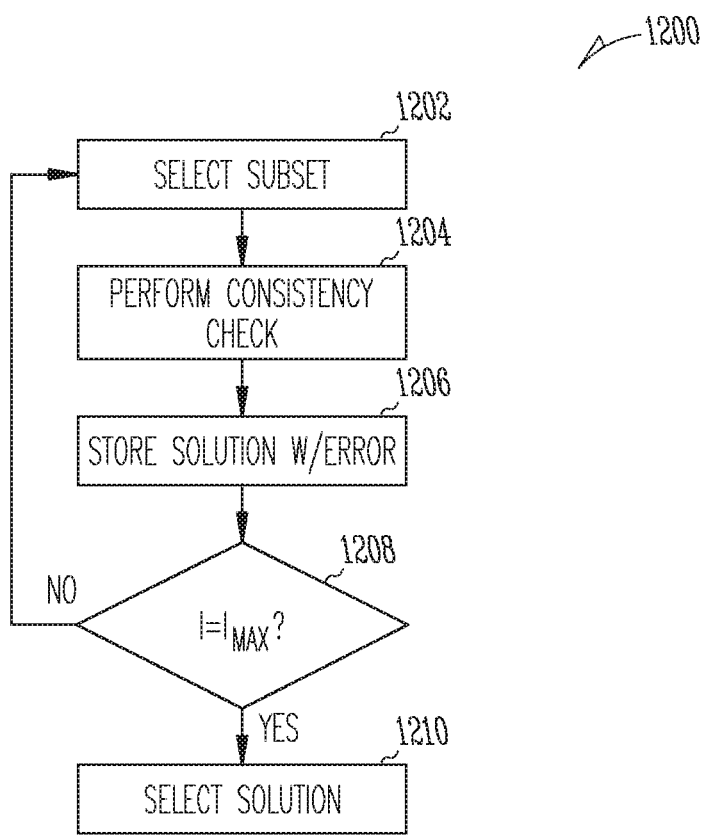
FIG. 12 illustrates a multi path algorithm in accordance with some aspects.
Figure 13:
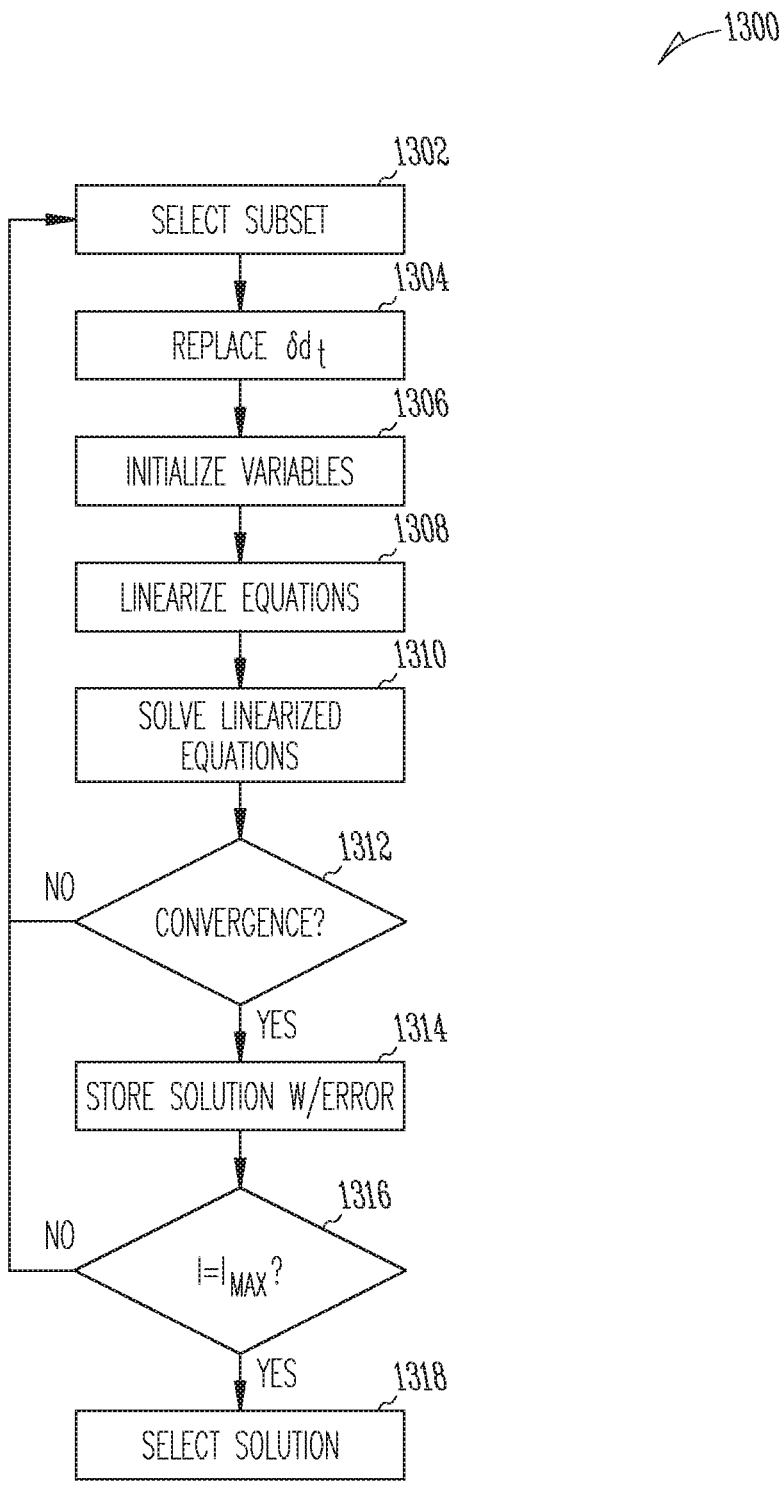
FIG. 13 illustrates a multipath rejection algorithm in accordance with some aspects.

The algorithm to determine the position in the presence of multipath may described in terms of a set of operations. FIG. 12 illustrates a. multipath algorithm in accordance with some aspects. The operations in the multipath algorithm 1200 may be performed at the device (e.g., vehicle, drone, UE).

At operation 1202, the processor in the device may select a subset of the positioning measurements. The measurements may include base station pseudoranging and GPS measurements. The subset may be selected randomly.

After the subset of measurements is selected, the processor may at operation 1204 perform a consistency check with these measurements.

At operation 1206, once the consistency check is performed, the solution may be stored with an error metric. The processor may then determine at operation 1208 whether to repeat operations 1202-1206 (whether the number of iterations has reached a maximum). If not, the iteration number is incremented (after being initialized prior to the first operation) and the process 1200 returns to operation 1202. Thus, the operations 1202-1206 are repeated for a predetermined number of iterations before a final solution is chosen at operation 1210. The final solution may be chosen as a function of the error metric.

Different design techniques may be used during the process 1200. The design techniques may include the choice of the subset, the consistency check algorithm, the choice of the error metric, and the number of iterations. In some aspects, a simple least squares cost function with an error metric may be used. In other aspects, a probabilistic/convex relaxation-based metric may be used to improve the performance at the cost of a higher complexity.

For a fixed location and a fixed time instant, the number of measurements is limited by the number of base stations and GPS satellites. However, as the device moves, a large number of measurements may be obtained across time and space. To exploit this diversity in measurements, the system may be integrated with VIO measurements to further improve the positioning accuracy.

To combine the VIO measurements with the ranging measurements to improve the positioning accuracy, changes are made to the process 1200 shown in FIG. 12, As above, all of the operations may be carried out at the device. To determine the position in the presence of multipath reflections while integrating VIO, the processor may modify operations 1202 and 1204 to choose a subset of measurements across space and time and perform a consistency check with these measurements using the information from the VIO. In various aspects, each of the choice of the subset, the consistency check algorithm, the choice of the error metric, and the number of iterations may be the same as that used in the process 1200 of FIG. 12 or may be different from those used in the process 1200 of FIG. 12.

There are various ways in which the VIO can be integrated in operation 1204 to provide a solution across time. The VIO may be used to tie measurements across time, thereby in effect providing a large diverse set of measurements for multipath rejection. In one example of the algorithm with a certain choice of the consistency check and the error metrics, for a drone, let $p_d(t)=(x(t), y(t), z(t))$ be the true location of the drone at a given time instant, t and let $p_s=(x_s, y_s, z_s)$ be the location of the satellite s. Similar to the above equations, the pseudorange measurement $\rho_{ds}(t)$ between the satellite and the drone at time t is given by:

$$\rho_{ds}(t)=\|p_d(t)-p_s\|+c_{GPS}+n_{ds} \quad (1)$$

$$\rho_{ds}(t)=\|p_d(0)+\delta d_t-p_s\|+c_{GPS}+n_{ds} \quad (2)$$

where, $C_{GPS}$ is the clock offset of the GPS clocks with respect to the drone internal clock, $\delta d_t$ is the displacement of the drone from time 0 and $n_{ds}$ is the noise in the measurement which includes the thermal noise, ionospheric and tropospheric errors.

Similarly, let $p_b=(x_b, y_b, z_b)$, be the location of base station b. The ranging measurement between the base station and the drone is given by:

$$\rho_{db}(t)=\|p_d(t)-p_b\|+c_{BS}+n_{db} \quad (3)$$

$$\rho_{db}(t)=\|p_d(0)+\delta d_t-p_b\|+c_{BS}+n_{db} \quad (4)$$

where, $C_{BS}$ is the clock offset of the base station clocks with respect to the drone internal clock and $n_{db}$ is the thermal noise in the measurement. FIG, 13 illustrates a multi path rejection algorithm in accordance with some aspects. The camera assisted multipath rejection algorithm is as follows, in which all these operations are carried out at the device:

At operation 1302, the processor in the device may select a subset of the positioning measurements. The measurements may include base station and GPS measurements. The subset may be selected randomly. In some aspects, each subset may contain K measurements, where K>4. For example, 5 measurements may be selected as the subset. At operation 1304, $\delta d_t$ may be replaced by $\hat{\delta}d_t$ obtained from the VIO.

At operation 1306, $\hat{p}_d^i(0)$, $\hat{c}_{BS}^i$ and $\hat{c}_{GPS}^i$ may be initialized. In some aspects, unlike the loose coupling initial location, $\hat{p}_d^i=0$ (i.e., the initial position may be null), $\hat{c}_{BS}^i=0$ (i.e., the initial clock offset of the base station clocks may be 0) and $\hat{c}_{GPS}^i=0$ (i.e., the initial clock offset of the GPS clocks may be 0). As above, i is the iteration index, which is reset to 0 upon initialization of the algorithm 1300.

At operation 1308, the base station and GPS equations may be linearized around $\hat{p}_d^i(0)$, $\hat{c}_{BS}^i$, $\hat{c}_{GPS}^i$. That is, the linearization may be performed using each equation.

At operation 1310, the linearized equations may be incremented and solved for mathematically. That is, the processor in the drone or location server may solve the linearized equations for $\hat{p}_d^{i+1}(0)$, $\hat{c}_{BS}^{i+1}$, $\hat{c}_{GPS}^{i+1}$. In some aspects, least squares may be used to solve the equations.

At operation 1312, the processor may determine whether the solutions to the linearized equations converge. If not, the process may return to operation 1308.

If at operation 1312, the processor determines that the solutions to the linearized equations converge, at operation 1314, the processor may store the residual error (error covariance matrix) and the solution (estimated position) after convergence for the equations. The sum of the diagonals of the error covariance matrix may be stored as an error metric.

The processor may then determine at operation 1316 whether to repeat operations 1302-1314 (whether the number of iterations has reached a maximum). If not, the iteration number is incremented (after being initialized prior to the first operation) and the process 1300 returns to operation 1302. This is similar to the procedure described in relation to FIG. 4. Thus, the operations 1302-1314 are repeated for a predetermined number of iterations before a final solution is chosen at operation 1318. The number of iterations may be determined by complexity of the computation or available computation power. Moreover, if the percentage of bad measurements is known (or expected), the number of iterations may be chosen to reduce the amount of computation used in light of the probability of randomly selecting a bad measurement. A bad measurement may be, for example, a measurement that exceeds a maximum error—which in some cases may be a measurement that indicates a position in excess of a maximum distance from an average of other individual positions. The final solution may be chosen as a solution with the least error (smallest error metric).

Solving the linearized equations across time may increase in complexity as time progresses. To reduce the complexity, a moving time window over which this algorithm is executed may be used. In other aspects, a Kalman filter may be used to integrate the measurements over time and then perform the consistency check.

Note that for a given location and a base station, it is likely that the measurement will be consistently affected by multipath reflections over a long period of time due to the existence of static blockers/reflectors. Hence, the information about a particular base station signal being LOS/NLOS could be fed back to the base station that can maintain a table of locations and the probability of the measurement being LOS/NLOS. This could be fed back to the drone which can further refine its location estimate.

In this case, the device may select a subset of measurements from satellite, base station reference signal, and/or VIO. The device may then perform a consistency check with these measurements, along with a sanity metric on these measurements. The device may then store the solution with an error metric and repeat the selection, consistency check and storing a predetermined number of times. Afterwards, the device may select the final solution as a function of the error metric. The device may report back to one or more of the base stations. The report may include the error metric, location and the measurements used to obtain the best solution. The base station may then update a table of locations and the sanity metric for that location based on the input.

Figure 14:
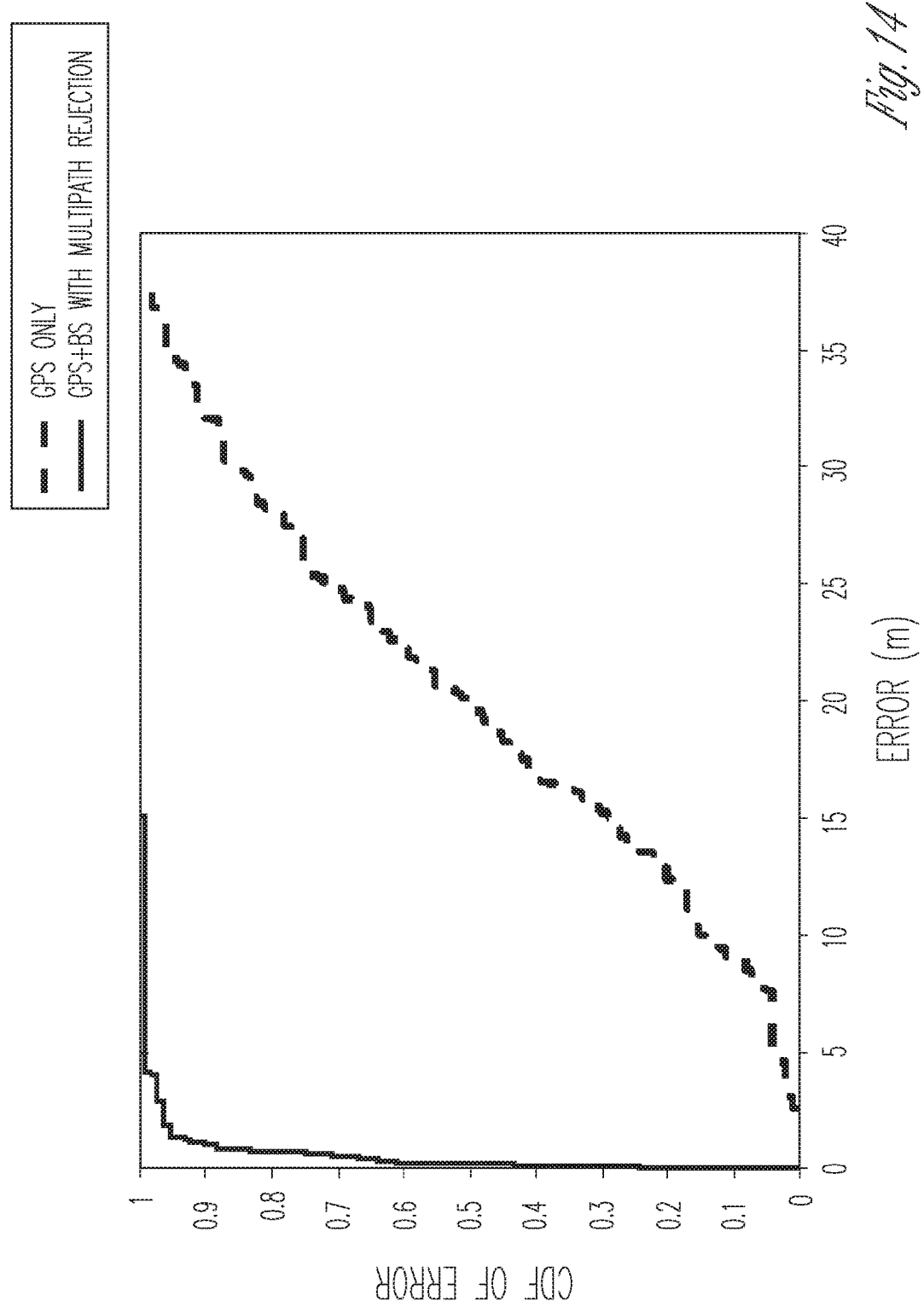
FIG. 14 illustrates a simulated plot of multipath error in accordance with some aspects.

FIG. 14 illustrates a simulated plot of multipath error in accordance with some aspects. A particular percentage of the measurements (GPS and BS) are corrupted with a large positively biased noise (multipath increases the observed distance as compared to the LOS path). As the percentage of the multipath corrupted measurements increases, the complexity increases for processing. 10% of the measurements are corrupted by a large positive noise to simulate multipath errors [uniform random 0 to 50 m]. FIG. 14 shows the error cumulative distribution function of the standard normal distribution. As is apparent, without multipath rejection the errors can be large (as usually seen in urban canyon environments). However, as shown, with the above multipath rejection algorithm, less than a meter error can be achieved even at the $90^{th}$ percentile.

EXAMPLES

Example 1 is an apparatus of a device, the apparatus comprising: a camera and accelerometers; a global position satellite (GPS) module configured to receive GPS signals from GPS satellites; a modem configured to receive cellular signals from base stations; and processing circuitry arranged to: determine a GPS fix from the GPS signals; measure cellular ranging data from the base stations and determine a cellular position from the measured data; obtain visual data from the camera and accelerometer data from the accelerometers and combine the visual and accelerometer data to generate a Visual Inertial Odometer (VIO) displacement; and combine, using one of a loose or tight coupling algorithm, the GPS fix, the cellular position, and the VIO displacement to determine a device position, the loose coupling algorithm to use the GPS fix to determine the cellular position, the tight coupling algorithm to use the GPS signals and measured data to determine the device position.

In Example 2, the subject matter of Example 1 includes, wherein the loose coupling algorithm comprises: initializing an intermediate position using the GPS fix and a clock offset of each base station clock to 0, linearizing base station position equations around the intermediate position and the clock offsets to obtain linearized base station position equations, solving the linearized base station position equations for a next iteration of the intermediate position and the clock offsets, and repeating the linearizing and solving until convergence of the intermediate position into a converged position, the cellular position being the converged position.

In Example 3, the subject matter of Examples 1-2 includes, wherein the tight coupling algorithm comprises: initializing an intermediate position to an initial position, and a base station clock offset of each base station clock and a GPS clock offset of each GPS satellite to 0, linearizing base station and GPS position equations around the intermediate position and the base station and GPS clock offsets to obtain linearized equations, solving the linearized equations for a next iteration of the intermediate position and the base station and GPS clock offsets, and repeating the linearizing and solving until convergence of the intermediate position into a converged position, the cellular position being the converged position.

In Example 4, the subject matter of Example 3 includes, wherein a number of iterations is dependent on a percentage of GPS or baseband measurements that are expected to exceed a maximum error.

In Example 5, the subject matter of Examples 3-4 includes, wherein convergence of the intermediate position occurs when intermediate positions of adjacent iterations are within a predetermined distance from each other.

In Example 6, the subject matter of Examples 3-5 includes, wherein: a pseudorange measurement ($\rho\_ds$) between one of the GPS satellites and the apparatus is given by: $\rho\_ds=|(|p\_d-p\_s|)|+c\_GPS+n\_ds$ where $|(|p\_d-p\_s|)|$ is a norm of $p\_d-p\_s$, a distance between a true location of the apparatus and a location indicated by the one of the GPS satellites, $c\_GPS$ is a clock offset of a GPS clock of the one of the GPS satellites with respect to an internal clock of the apparatus and $n\_ds$ is noise in the pseudorange measurement, and a ranging measurement ($\rho\_db$) between one of the base stations and the apparatus is given by: $\rho\_db=|(|p\_b-p\_s|)|+c\_BS+n\_db$ where $|(|p\_d-p\_b|)|$ is a norm of $p\_d-p\_b$, a distance between the true location of the apparatus and the one of the base stations, $c\_BS$ is a clock offset of a clock of the one of the base stations with respect to the internal clock of the apparatus and $n\_dbis$ noise in the ranging measurement.

In Example 7, the subject matter of Example 6 includes, wherein: $p\_d$, the true location of the apparatus, moves over time by $\delta d\_t$, the VIO displacement.

In Example 8, the subject matter of Examples 6-7 includes, wherein linearization comprises using a first order Taylors expansion around the initial position.

In Example 9, the subject matter of Examples 6-8 includes, wherein the processor is further configured to perform a least squares method to estimate the device position, the clock offsets of the GPS satellites, and the clock offsets of the base stations.

In Example 10, the subject matter of Examples 1-9 includes, wherein the processor is further configured to: determine whether multipath reflections are present; in response to a determination that multipath reflections are present, for each of multiple cycles: choose a random subset of measurements among GPS data and the measured cellular ranging data, linearize base station and GPS position equations around an initial position, a base station clock offset of each base station clock and a GPS clock offset of each GPS satellite to obtain linearized equations, the linearized equations taking into account a VIO displacement between a previous iteration and a current iteration, solve the linearized equations using a least squares method to obtain an estimated device position and an error covariance matrix for the current iteration, store the estimated device position and error covariance matrix, repeat the linearization and solution of the random subset of measurements for a plurality of iterations until convergence of the estimated device position, and store a sum of the diagonals of the error covariance matrix as an error metric after convergence of the estimated device position; and after a final cycle, choose an estimated device position that has a smallest error metric.

Example 11 is a non-transitory computer-readable storage medium that stores instructions for execution by one or more processors of a device, the one or more processors to configure the device to, when the instructions are executed: receive global position satellite (GPS) signals from GPS satellites and cellular signals from a base station; and engage in a loose or tight coupling algorithm, in which the one or more processors configure the device to, for each of a plurality of iterations: determine a ranging measurement ($\rho\_db$) between the base station and the device, wherein: $\rho\_db=|(|p\_d+\delta d\_t-p\_b|)|+c\_BS+n\_db$ where $|(|p\_d+\delta d\_t-p\_b|)|$ is a norm of $p\_d+\delta d\_t-p\_b$, a distance between a true location of the device ($p\_d$) and a position of the device determined using the cellular signals ($p\_b$) modified by a Visual Inertial Odometer (VIO) displacement ($\delta d\_t$) of the device from a previous iteration, $c\_BS$ is a base station clock offset with respect to an internal clock of the device and $n\_db$ is noise in the ranging measurement, and linearize at least the ranging measurement around an intermediate position of the device and the base station clock offset to obtain a linearized equation, solve the linearized equation, and repeat the linearizing and solving until convergence of the intermediate position into a device position.

In Example 12, the subject matter of Example 11 includes, wherein the loose coupling algorithm uses a device location determined using the GPS signals as an initial position, and the tight coupling algorithm uses the GPS signals and cellular signals during linearizing and solving to determine the device position.

In Example 13, the subject matter of Example 12 includes, wherein, during the tight coupling algorithm, the one or more processors configure the device to: initialize the intermediate position to the initial position, and a base station clock offset of each base station clock and a GPS clock offset of each GPS satellite to 0, determine a pseudorange measurement ($\rho\_ds$) between the GPS satellites and the device, wherein: $\rho\_ds=|(|p\_d+\delta d\_t-p\_s|)|+c\_GPS+n\_ds$ where $|(|p\_d+\delta d\_t-p\_s|)|$ is a norm of $p\_d+\delta d\_t-p\_s$, a distance between the true location of the device ($p\_d$) and a position of the device determined using the GPS signals ($p\_s$) modified by the VIO displacement ($\delta d\_t$) of the device from the previous iteration, $c\_GPS$ is a clock offset of a GPS clock of one of the GPS satellites with respect to the internal clock of the apparatus and $n\_ds$ is noise in the pseudorange measurement, and linearize the pseudorange measurement in addition to the ranging measurement around the intermediate position and the base station and GPS clock offsets to obtain the linearized equations, solve the linearized equations, and repeat the linearizing and solving until convergence of the intermediate position into the device position.

In Example 14, the subject matter of Example 13 includes, wherein a number of the iterations is dependent on a percentage of GPS or baseband measurements that are expected to exceed a maximum error.

In Example 15, the subject matter of Examples 13-14 includes, wherein convergence of the intermediate position occurs when intermediate positions of adjacent iterations are within a predetermined distance from each other.

In Example 16, the subject matter of Examples 13-15 includes, wherein the one or more processors configure the device to perform a least squares method to estimate the device position, the clock offsets of the GPS satellites, and the clock offsets of the base stations.

In Example 17, the subject matter of Examples 13-16 includes, wherein the one or more processors configure the device to: determine whether multipath reflections are present; in response to a determination that multipath reflections are present, for each of multiple cycles: choose a random subset of measurements among GPS data and the cellular signals, linearize the pseudorange measurement and the ranging measurement around the initial position, the base station clock offset of the base station clock and the GPS clock offset of each GPS satellite to obtain linearized equations, the linearized equations taking into account the VIO displacement between a previous iteration and a current iteration, solve the linearized equations using a least squares method to obtain an estimated device position and an error covariance matrix for the current iteration, store the estimated device position and error covariance matrix, repeat the linearization and solution of the random subset of measurements for a plurality of iterations until convergence of the estimated device position, and store a sum of the diagonals of the error covariance matrix as an error metric after convergence of the estimated device position; and after a final cycle, choose an estimated device position that has a smallest error metric.

Example 18 is a method of determining position of a device, the method comprising: receiving global position satellite (GPS) signals from GPS satellites and cellular signals from a base station; and engaging in loose or tight coupling algorithm, in which the one or more processors configure the device to, for each of a plurality of iterations: determining a ranging measurement between the base station and the device, the ranging measurement being a function of a norm of a distance between a true location and a position of the device determined using the cellular signals modified by a Visual Inertial Odometer (VIO) displacement of the device from a previous iteration, and linearizing at least the ranging measurement around an intermediate position of the device and the base station clock offset to obtain a linearized equation, solving the linearized equation, and repeating the linearizing and solving until convergence of the intermediate position into a device position.

In Example 19, the subject matter of Example 18 includes, wherein the loose coupling algorithm uses a device location determined using the GPS signals as an initial position, and the tight coupling algorithm uses the GPS signals and cellular signals during linearizing and solving to determine the device position.

In Example 20, the subject matter of Example 19 includes, wherein the ranging measurement ($\rho\_db$) is $\rho\_db=|(|p\_d+\delta d\_t-p\_b|)|+c\_BS+n\_db$ where $|(|p\_d+\delta d\_t-p\_b|)|$ is the norm of $p\_d+\delta d\_t-p\_b$, the distance between the true location of the device ($p\_d$) and the position of the device determined using the cellular signals ($p\_b$) modified by the Visual Inertial Odometer (VIO) displacement ($\delta d\_t$) of the device from a previous iteration, $c\_BS$ is the clock offset of the base station with respect to an internal clock of the device and n_dbis noise in the ranging measurement.

In Example 21, the subject matter of Examples 18-20 includes, wherein, during the tight coupling algorithm, the method further comprises: initializing the intermediate position to the initial position, and a base station clock offset of each base station clock and a GPS clock offset of each GPS satellite to 0, determining a pseudorange measurement (ρ_ds) between the GPS satellites and the device, wherein: ρ_ds=|(|p_d+δd_t-p_s|)|+c_GPS+n_ds where |(|p_d+δd_t-p_s|)| is a norm of p_d+δd_t-p_s, a distance between the true location of the device (p_d) and a position of the device determined using the GPS signals (p_s) modified by the VIO displacement (δd_t) of the device from the previous iteration, c_GPS is a clock offset of a GPS clock of one of the GPS satellites with respect to the internal clock of the apparatus and n_dsis noise in the pseudorange measurement, linearizing the pseudorange measurement in addition to the ranging measurement around the intermediate position and the base station and GPS clock offsets to obtain the linearized equations, solving the linearized equations, and repeating the linearizing and solving until convergence of the intermediate position into the converged position.

In Example 22, the subject matter of Examples 18-21 includes, wherein the method further comprises: determining whether multipath reflections are present; in response to a determination that multipath reflections are present, for each of multiple cycles: choosing a random subset of measurements among GPS data and the cellular signals, linearizing the pseudorange measurement and the ranging measurement around the initial position, the base station clock offset of the base station clock and the GPS clock offset of each GPS satellite to obtain linearized equations, the linearized equations taking into account the VIO displacement between a previous iteration and a current iteration, solving the linearized equations using a least squares method to obtain an estimated device position and an error covariance matrix for the current iteration, storing the estimated device position and error covariance matrix, repeating the linearization and solution of the random subset of measurements for a plurality of iterations until convergence of the estimated device position, and storing a sum of the diagonals of the error covariance matrix as an error metric after convergence of the estimated device position; and after a final cycle, choosing an estimated device position that has a smallest error metric.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus of a device, the apparatus comprising:
   a camera and accelerometers;
   a global position satellite (GPS) module configured to receive GPS signals from GPS satellites;
   a modem configured to receive cellular signals from base stations; and
   processing circuitry arranged to:
      determine a GPS fix from the GPS signals;
      measure cellular ranging data from the base stations and determine a cellular position from the measured data;
      obtain visual data from the camera and accelerometer data from the accelerometers and combine the visual and accelerometer data to generate a Visual Inertial Odometer (VIO) displacement; and
      combine, using one of a loose or tight coupling algorithm, the GPS fix, the cellular position, and the VIO displacement to determine a device position, the loose coupling algorithm to use the GPS fix to determine the cellular position, the tight coupling algorithm to use the GPS signals and measured data to determine the device position,
   wherein at least one of the loose or tight coupling algorithm comprises initializing an intermediate position using location information that is dependent on which of the at least one of the loose or tight coupling algorithm is used, linearizing base station position equations using the intermediate position, solving the linearized position equations for a next iteration of the intermediate position and repeating the linearizing and solving until convergence of the intermediate position into a converged position, the cellular position being the converged position.

2. The apparatus of claim 1, wherein the loose coupling algorithm comprises:
   initializing the intermediate position using the GPS fix and a clock offset of each base station clock to 0,
   linearizing base station position equations around the intermediate position and the clock offsets to obtain linearized base station position equations,
   solving the linearized base station position equations for the next iteration of the intermediate position and the clock offsets, and repeating the linearizing and solving until convergence of the intermediate position into the converged position, the cellular position being the converged position.

3. The apparatus of claim 1, wherein the tight coupling algorithm comprises:
initializing the intermediate position to an initial position, and a base station clock offset of each base station clock and a GPS clock offset of each GPS satellite to 0,
linearizing base station and GPS position equations around the intermediate position and the base station and GPS clock offsets to obtain linearized equations,
solving the linearized equations for the next iteration of the intermediate position and the base station and GPS clock offsets, and
repeating the linearizing and solving until convergence of the intermediate position into the converged position, the cellular position being the converged position.

4. The apparatus of claim 3, wherein a number of iterations is dependent on a percentage of GPS or baseband measurements that are expected to exceed a maximum error.

5. The apparatus of claim 3, wherein convergence of the intermediate position occurs when intermediate positions of adjacent iterations are within a predetermined distance from each other.

6. The apparatus of claim 3, wherein:
a pseudorange measurement ($\rho_{ds}$) between one of the GPS satellites and the apparatus is given by:

$$\rho_{db} = \|p_d - p_s\| + C_{GPS} + n_{db}$$

where $\|p_d - p_s\|$ is a norm of $p_d - p_s$, a distance between a true location of the apparatus and a location indicated by the one of the GPS satellites, $c_{GPS}$ is a clock offset of a GPS clock of the one of the GPS satellites with respect to an internal clock of the apparatus and $n_{ds}$ is noise in the pseudorange measurement, and
a ranging measurement ($\rho_{db}$) between one of the base stations and the apparatus is given by:

$$\rho_{db} = \|p_b - p_s\| + C_{BS} + n_{db}$$

where $\|p_d - p_b\|$ is a norm of $p_d - p_b$, a distance between the true location of the apparatus and the one of the base stations, $C_{BS}$ is a clock offset of a clock of the one of the base stations with respect to the internal clock of the apparatus and is noise in the ranging measurement.

7. The apparatus of claim 6, wherein:
$p_d$, the true location of the apparatus, moves over time by $\delta d_t$, the VIO displacement.

8. The apparatus of claim 6, wherein linearization comprises using a first order Taylors expansion around the initial position.

9. The apparatus of claim 6, wherein the processor is further configured to perform a least squares method to estimate the device position, the clock offsets of the GPS satellites, and the clock offsets of the base stations.

10. The apparatus of claim 1, wherein the processor is further configured to:
determine whether multipath reflections are present;
in response to a determination that multipath reflections are present, for each of multiple cycles:
choose a random subset of measurements among GPS data and the measured cellular ranging data,
linearize base station and GPS position equations around the initial position, a base station clock offset of each base station clock and a GPS clock offset of each GPS satellite to obtain linearized equations, the linearized equations taking into account a VIO displacement between a previous iteration and a current iteration,
solve the linearized equations using a least squares method to obtain an estimated device position and an error covariance matrix for the current iteration,
store the estimated device position and error covariance matrix,
repeat the linearization and solution of the random subset of measurements for a plurality of iterations until convergence of the estimated device position, and
store a sum of the diagonals of the error covariance matrix as an error metric after convergence of the estimated device position; and
after a final cycle, choose an estimated device position that has a smallest error metric.

11. A non-transitory computer-readable storage medium that stores instructions for execution by one or more processors of a device, the one or more processors to configure the device to, when the instructions are executed:
receive global position satellite (GPS) signals from GPS satellites and cellular signals from a base station; and
engage in a loose or tight coupling algorithm, in which the one or more processors configure the device to, for each of a plurality of iterations:
determine a ranging measurement ($\rho_{db}$) between the base station and the device, wherein:

$$\rho_{db} = \|p_d + \delta d_t - p_b\| + C_{BS} + n_{db}$$

where $\|p_d + \delta d_t - p_b\|$ is a norm of $p_d + \delta d_t - p_b$, a distance between a true location of the device ($p_d$) and a position of the device determined using the cellular signals ($p_b$) modified by a Visual Inertial Odometer (VIO) displacement ($\delta d_t$) of the device from a previous iteration, $C_{BS}$ is a base station clock offset with respect to an internal clock of the device and nab is noise in the ranging measurement, and
linearize at least the ranging measurement around an intermediate position of the device and the base station clock offset to obtain a linearized equation, solve the linearized equation, and repeat the linearizing and solving until convergence of the intermediate position into a device position.

12. The medium of claim 11, wherein the loose coupling algorithm uses a device location determined using the GPS signals as an initial position, and the tight coupling algorithm uses the GPS signals and cellular signals during linearizing and solving to determine the device position.

13. The medium of claim 12, wherein, during the tight coupling algorithm, the one or more processors configure the device to:
initialize the intermediate position to the initial position, and a base station clock offset of each base station clock and a GPS clock offset of each GPS satellite to 0,
determine a pseudorange measurement ($p_{ds}$) between the GPS satellites and the device, wherein:

$$\rho_{ds} = \|p_d + \delta d_t - p_s\| + C_{GPS} + n_{ds}$$

where $\|p_d + \delta d_t - p_s\|$ is a norm of $p_d + \delta d_t - p_s$, a distance between the true location of the device ($p_d$) and a position of the device determined using the GPS signals ($p_s$) modified by the VIO displacement ($\delta d_t$) of the device from the previous iteration, $C_{GPS}$ is a clock offset of a GPS clock of one of the GPS satellites with respect to the internal clock of the apparatus and $n_{ds}$ is noise in the pseudorange measurement, and
linearize the pseudorange measurement in addition to the ranging measurement around the intermediate position and the base station and GPS clock offsets to obtain the linearized equations, solve the linearized equations, and repeat the linearizing and solving until convergence of the intermediate position into the device position.

14. The medium of claim 13, wherein a number of the iterations is dependent on a percentage of GPS or baseband measurements that are expected to exceed a maximum error.

15. The medium of claim 13, wherein convergence of the intermediate position occurs when intermediate positions of adjacent iterations are within a predetermined distance from each other.

16. The medium of claim 13, wherein the one or more processors configure the device to perform a least squares method to estimate the device position, the clock offsets of the GPS satellites, and the clock offsets of the base stations.

17. The medium of claim 13, wherein the one or more processors configure the device to:
   determine whether multipath reflections are present;
   in response to a determination that multipath reflections are present, for each of multiple cycles:
   choose a random subset of measurements among GPS data and the cellular signals,
   linearize the pseudorange measurement and the ranging measurement around the initial position, the base station clock offset of the base station clock and the GPS clock offset of each GPS satellite to obtain linearized equations, the linearized equations taking into account the VIO displacement between a previous iteration and a current iteration,
   solve the linearized equations using a least squares method to obtain an estimated device position and an error covariance matrix for the current iteration,
   store the estimated device position and error covariance matrix,
   repeat the linearization and solution of the random subset of measurements for a plurality of iterations until convergence of the estimated device position, and
   store a sum of the diagonals of the error covariance matrix as an error metric after convergence of the estimated device position; and
   after a final cycle, choose an estimated device position that has a smallest error metric.

18. A method of determining position of a device, the method comprising:
   receiving global position satellite (GPS) signals from GPS satellites and cellular signals from a base station; and
   engaging in loose or tight coupling algorithm, in which the one or more processors configure the device to, for each of a plurality of iterations:
   determining a ranging measurement between the base station and the device, the ranging measurement being a function of a norm of a distance between a true location and a position of the device determined using the cellular signals modified by a Visual Inertial Odometer (VIO) displacement of the device from a previous iteration, and
   linearizing at least the ranging measurement around an intermediate position of the device and the base station clock offset to obtain a linearized equation, solving the linearized equation, and repeating the linearizing and solving until convergence of the intermediate position into a device position.

19. The method of claim 18, wherein the loose coupling algorithm uses a device location determined using the GPS signals as an initial position, and the tight coupling algorithm uses the GPS signals and cellular signals during linearizing and solving to determine the device position.

20. The method of claim 19, wherein the ranging measurement ($\rho_{db}$) is $$\rho_{db} = \|p_d + \delta d_t - p_b\| + C_{BS} + n_{ds}$$

where $\|p_d + \delta d_t - p_b\|$ is the norm of $\|p_d + \delta d_t - p_b\|$, the distance between the true location of the device ($p_d$) and the position of the device determined using the cellular signals ($p_b$) modified by the Visual Inertial Odometer (VIO) displacement ($\delta d_t$) of the device from a previous iteration, $C_{BS}$ is the clock offset of the base station with respect to an internal clock of the device and $n_{db}$ is noise in the ranging measurement.

21. The method of claim 18, wherein, during the tight coupling algorithm, the method further comprises:
   initializing the intermediate position to the initial position, and a base station clock offset of each base station clock and a GPS clock offset of each GPS satellite to 0,
   determining a pseudorange measurement ($\rho_{ds}$) between the GPS satellites and the device, wherein:

$$\rho_{ds} = \|p_d + \delta d_t - p_s\| + C_{GPS} + n_{ds}$$

where $\|p_d + \delta d_t - p_s\|$ is a norm of $p_d + \delta d_t - p_s$, a distance between the true location of the device ($p_d$) and a position of the device determined using the GPS signals ($p_s$) modified by the VIO displacement ($\delta d_t$) of the device from the previous iteration, $C_{GPS}$ is a clock offset of a GPS clock of one of the GPS satellites with respect to the internal clock of the apparatus and $n_{ds}$ is noise in the pseudorange measurement,
   linearizing the pseudorange measurement in addition to the ranging measurement around the intermediate position and the base station and GPS clock offsets to obtain the linearized equations,
   solving the linearized equations, and
   repeating the linearizing and solving until convergence of the intermediate position into the converged position.

22. The method of claim 18, wherein the method further comprises:
   determining whether multipath reflections are present;
   in response to a determination that multipath reflections are present, for each of multiple cycles:
   choosing a random subset of measurements among GPS data and the cellular signals,
   linearizing the pseudorange measurement and the ranging measurement around the initial position, the base station clock offset of the base station clock and the GPS clock offset of each GPS satellite to obtain linearized equations, the linearized equations taking into account the VIO displacement between a previous iteration and a current iteration,
   solving the linearized equations using a least squares method to obtain an estimated device position and an error covariance matrix for the current iteration,
   storing the estimated device position and error covariance matrix,
   repeating the linearization and solution of the random subset of measurements for a plurality of iterations until convergence of the estimated device position, and
   storing a sum of the diagonals of the error covariance matrix as an error metric after convergence of the estimated device position; and
   after a final cycle, choosing an estimated device position that has a smallest error metric.

* * * * *

UNITED STATES PATENT AND TRADEMARK OFFICE
CERTIFICATE OF CORRECTION

PATENT NO. : 10,578,743 B1
APPLICATION NO. : 16/234193
DATED : March 3, 2020
INVENTOR(S) : Kalathil et al.

It is certified that error appears in the above-identified patent and that said Letters Patent is hereby corrected as shown below:

In the Claims

In Column 27, Line 30, in Claim 6, delete "$\|p_d\text{-}p_s\|$ is" and insert --$\|p_d - p_s\|$ is-- therefor In Column 27, Line 40, in Claim 6, delete "$\|p_d\text{-}p_b\|$ is" and insert --$\|p_d - p_b\|$ is-- therefor In Column 28, Line 33, in Claim 11, delete "nab" and insert --$n_{db}$-- therefor In Column 29, Line 52, in Claim 18, delete "ofa" and insert --of a-- therefor Signed and Sealed this
Thirteenth Day of October, 2020

Andrei Iancu
*Director of the United States Patent and Trademark Office*